(12) United States Patent
Wang et al.

(10) Patent No.: US 12,157,502 B2
(45) Date of Patent: Dec. 3, 2024

(54) SYSTEM AND METHOD FOR PARKING AN AUTONOMOUS EGO-VEHICLE IN A DYNAMIC ENVIRONMENT OF A PARKING AREA

(71) Applicant: Mitsubishi Electric Research Laboratories, Inc., Cambridge, MA (US)

(72) Inventors: Yebin Wang, Cambridge, MA (US); Jessica Leu, Berkeley, CA (US); Stefano Di Cairano, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 339 days.

(21) Appl. No.: 17/654,709

(22) Filed: Mar. 14, 2022

(65) Prior Publication Data
US 2023/0278593 A1    Sep. 7, 2023

Related U.S. Application Data

(60) Provisional application No. 63/268,725, filed on Mar. 1, 2022.

(51) Int. Cl.
*B60W 60/00*       (2020.01)
*B60W 30/06*       (2006.01)
*B60W 50/00*       (2006.01)

(52) U.S. Cl.
CPC ...... *B60W 60/00276* (2020.02); *B60W 30/06* (2013.01); *B60W 50/0097* (2013.01);
(Continued)

(58) Field of Classification Search
CPC .......... B60W 60/00276; B60W 30/06; B60W 50/0097; B60W 2554/20;
(Continued)

(56) References Cited

U.S. PATENT DOCUMENTS

| 8,624,756 B2 | 1/2014 | Ganot |
| 10,384,718 B1 * | 8/2019 | Kentley-Klay ........ G08G 1/168 |

(Continued)

OTHER PUBLICATIONS

Jeong, Yonghwan, Seonwook Kim, Byeong Rim Jo, Hyunseok Shin, and Kyongsu Yi. "Sampling Based Vehicle Motion Planning for Autonomous Valet Parking with Moving Obstacles." International Journal of Automotive Engineering 9, No. 4 (2018): 215-222.

*Primary Examiner* — Richard A Goldman
(74) *Attorney, Agent, or Firm* — Gene Vinokur

(57) ABSTRACT

The present disclosure provides a system and a method for parking an autonomous ego-vehicle in a dynamic environment of a parking area. The method includes collecting measurements of a state of the dynamic environment, a state of one or multiple stationary vehicles and one or multiple obstacle vehicles moving in the parking area. The method further includes executing a path planner configured to produce a trajectory based on the state of the dynamic environment and executing an environment predictor configured to predict a path and a mode of motion for each of the obstacle vehicles. The method further includes determining a safety constraint for each of the obstacle vehicles based on the path and the mode of motion for each of the obstacle vehicles and parking the autonomous ego-vehicle based on the trajectory for parking and the safety constraint for each of the obstacle vehicles.

17 Claims, 22 Drawing Sheets

(52) U.S. Cl.
CPC . *B60W 2050/0052* (2013.01); *B60W 2554/20* (2020.02); *B60W 2554/4041* (2020.02); *B60W 2554/4042* (2020.02); *B60W 2554/4044* (2020.02)

(58) Field of Classification Search
CPC . B60W 2554/4041; B60W 2554/4042; B60W 2554/4044; B60W 2050/0052
USPC .......................................................... 701/26
See application file for complete search history.

(56) References Cited

U.S. PATENT DOCUMENTS

| | | | | |
|---|---|---|---|---|
| 10,394,243 | B1* | 8/2019 | Ramezani | B60W 30/10 |
| 10,809,732 | B2 | 10/2020 | Merl | |
| 11,498,587 | B1* | 11/2022 | Mitlin | G05D 1/0214 |
| 11,762,390 | B1* | 9/2023 | Alagic | G06V 10/25 |
| | | | | 701/23 |
| 2002/0082024 | A1* | 6/2002 | Bajikar | H04W 64/00 |
| | | | | 455/456.1 |
| 2002/0165649 | A1* | 11/2002 | Wilhelm Rekow | G05D 1/0295 |
| | | | | 701/466 |
| 2003/0227395 | A1* | 12/2003 | Zeineh | G08G 5/0013 |
| | | | | 340/988 |
| 2010/0248896 | A1* | 9/2010 | Dreier | F16H 61/0213 |
| | | | | 477/118 |
| 2012/0306664 | A1* | 12/2012 | Geter | G08G 1/166 |
| | | | | 340/903 |
| 2015/0073705 | A1* | 3/2015 | Hiwatashi | G01S 19/13 |
| | | | | 701/468 |
| 2016/0023703 | A1* | 1/2016 | Braggin | B62J 6/26 |
| | | | | 362/473 |
| 2017/0344007 | A1* | 11/2017 | Song | G05D 1/0217 |
| 2018/0093664 | A1* | 4/2018 | Kim | B60W 40/10 |
| 2018/0099661 | A1* | 4/2018 | Bae | B60W 30/06 |
| 2019/0004508 | A1* | 1/2019 | Bonander | B60W 30/06 |
| 2019/0113927 | A1* | 4/2019 | Englard | G06F 16/285 |
| 2019/0146515 | A1* | 5/2019 | De Salvo | G05D 1/024 |
| | | | | 701/23 |
| 2019/0202494 | A1* | 7/2019 | Itou | B62D 15/025 |
| 2019/0329761 | A1* | 10/2019 | Kim | G06V 20/586 |
| 2020/0035124 | A1* | 1/2020 | Li | G09B 19/16 |
| 2020/0156631 | A1* | 5/2020 | Lin | B60W 30/0956 |
| 2020/0183401 | A1* | 6/2020 | Yang | G08G 1/166 |
| 2020/0265731 | A1* | 8/2020 | Lev | B64C 39/024 |
| 2020/0342760 | A1* | 10/2020 | Vassilovski | G08G 1/161 |
| 2021/0039639 | A1* | 2/2021 | Song | B60W 50/0097 |
| 2021/0116930 | A1 | 4/2021 | Ariki | |
| 2021/0129836 | A1* | 5/2021 | Nguyen | B60W 50/0097 |
| 2021/0139026 | A1* | 5/2021 | Phan | B60W 30/0956 |
| 2021/0179078 | A1* | 6/2021 | Nakada | G08G 1/143 |
| 2021/0370915 | A1* | 12/2021 | Solar | H04B 17/318 |
| 2022/0009552 | A1* | 1/2022 | Sakai | G06V 10/462 |
| 2022/0066459 | A1* | 3/2022 | Jain | G05D 1/617 |
| 2022/0076432 | A1* | 3/2022 | Ramezani | G01S 17/931 |
| 2022/0107414 | A1* | 4/2022 | Maheshwari | G01S 7/412 |
| 2022/0114885 | A1* | 4/2022 | Ran | B60W 40/04 |
| 2022/0219731 | A1* | 7/2022 | Ran | G06V 20/597 |
| 2022/0270476 | A1* | 8/2022 | Ran | H04W 4/44 |
| 2022/0324487 | A1* | 10/2022 | Matsumura | G05D 1/0038 |
| 2022/0332337 | A1* | 10/2022 | Ran | B60W 60/001 |
| 2022/0340177 | A1* | 10/2022 | Khayatian | B60W 60/00 |
| 2023/0008289 | A1* | 1/2023 | Shangguan | B60W 30/09 |
| 2023/0043474 | A1* | 2/2023 | Metz | B60W 60/0017 |
| 2023/0043601 | A1* | 2/2023 | Foil | G01S 7/4802 |
| 2023/0055038 | A1* | 2/2023 | Omi | B60W 40/06 |
| 2023/0106673 | A1* | 4/2023 | Asghar | A61B 5/163 |
| | | | | 382/104 |
| 2023/0162508 | A1* | 5/2023 | Xia | B60W 60/00274 |
| | | | | 382/104 |
| 2023/0174106 | A1* | 6/2023 | Xiang | B60W 30/06 |
| | | | | 701/23 |
| 2023/0278593 | A1* | 9/2023 | Wang | B60W 30/06 |
| | | | | 701/26 |
| 2023/0311856 | A1* | 10/2023 | Nordbruch | B60W 30/06 |
| | | | | 701/23 |

* cited by examiner

SYSTEM AND METHOD FOR PARKING AN AUTONOMOUS EGO-VEHICLE IN A DYNAMIC ENVIRONMENT OF A PARKING AREA

TECHNICAL FIELD

The present disclosure relates generally to motion planning for autonomous vehicle parking, and more specifically to a system and a method for parking an autonomous ego-vehicle in a dynamic environment of a parking area.

BACKGROUND

Several parking systems are used in autonomous vehicles to automatically park the autonomous vehicle at a parking spot in a parking area. A parking task can be formulated as determining a path or motion of the autonomous vehicle from an initial state to a target state defining the parking spot and then controlling actuators of the autonomous vehicle, e.g., vehicle's gas pedal and steering wheel, to ensure that the autonomous vehicle follows the determined path or motion.

However, the parking area may include obstacles, such as moving obstacle vehicles or pedestrians, which the autonomous vehicle should not collide with during parking at the parking spot. Further, the autonomous parking may also involve motion planning in a narrow space. Additionally, in contrast to driving on roads or highways, vehicle motions in the parking area do not have a clear set of rules to follow and largely depend on driver's intention or even skill level. These make motion prediction of the obstacle vehicles and the motion planning of the autonomous vehicle for parking challenging.

The motion prediction, i.e., predicting future states of the obstacle vehicles, is crucial as it determines safety constraints that planning and control modules of the autonomous vehicle has to consider, and thus impacts feasibility and smoothness of the motion planning or the path. Particularly, an accurate short-term motion prediction enables the autonomous vehicle to plan and react safely to the autonomous vehicles, whereas long-term plan/mode prediction allows the autonomous vehicle to plan efficiently and smoothly. Some approaches use an interacting multiple model (IMM) to predict short-term trajectories in parking; while others use classifiers to extract information from movements of the obstacle vehicles to generate short-term motion predictions. However, such data driven methods are not desirable due to lack of guarantee and performance inconsistency with different data sets, and the data driven methods may present a larger prediction error if the data set is chosen poorly.

Additionally, general motion planning algorithms are not directly suitable for parking in presence of the obstacle vehicles which requires rapid re-planning for complicated driving maneuvers. On the other hand, motion planners specialized in the autonomous parking either fail to integrate short-horizon planning with long-horizon planning or cannot adequately incorporate online path repairing upon new obstacles in the parking area.

Accordingly, there is still a need for a system and a method for parking the autonomous vehicle in a dynamic environment of the parking area.

SUMMARY

It is an object of some embodiments provide a system and a method for parking an autonomous ego-vehicle in a dynamic environment of a parking area. Additionally, it is an object to some embodiments to provide a strategic motion planner that varies control strategy of the autonomous ego-vehicle based on different situations in the parking area, for parking the autonomous vehicle. The parking area includes parking spots for parking vehicles. The parking area may further include stationary vehicles parked in the parking area and an obstacle vehicle moving in the parking area.

It is an object of some embodiments to park the autonomous ego-vehicle in such a dynamic environment of the parking area, without colliding with the stationary vehicles, the obstacle vehicle, and other obstacles that may be present in the parking area. For example, the autonomous ego-vehicle has an initial state and needs to be parked at a parking spot defined by a target state, without colliding with the stationary vehicles and the obstacle vehicle. Each state, e.g., the initial state and the target state, defines at least a position (x, y) in a 2D plane and an orientation $\theta$ of the autonomous ego-vehicle.

To achieve such an objective some embodiments, at first, collect measurements of a state of the dynamic environment in the parking area indicative of available parking spots in the parking area, a state of each of the stationary vehicles, and a state of the obstacle vehicle. In an embodiment, the state of the obstacle vehicle may include a position and an orientation of the obstacle vehicle, and geometric information of the obstacle vehicle, for example, its wheelbase. Further, a path planner is executed to produce a trajectory for parking the autonomous ego-vehicle, based on the state of the dynamic environment in the parking area.

Some embodiments are based on the realization that motion of the obstacle vehicle needs to be considered for achieving collision-free parking of the autonomous ego-vehicle in the parking area. To that end, some embodiments aim to predict a path of the obstacle vehicle.

However, some embodiments are based on realization that, considering the dynamic environment of the parking area, it is insufficient to predict only the path of the obstacle vehicle, it is also useful to determine a mode of the motion of the obstacle vehicle. Some embodiments are based on observation that the obstacle vehicle runs in various modes in the parking area, such as a cruising mode and a maneuvering mode. In the cruising mode, the obstacle vehicle has small or steady steering angles. The obstacle vehicle runs in the cruising mode when the obstacle vehicle enters the parking area and is approaching a parking spot or when the obstacle vehicle is exiting the parking area. In the maneuvering mode, the obstacle vehicle changes the steering angle frequently and deviates from its path to park or leave narrow parking spot.

To that end, it is an objective of some embodiments to predict both the path and the mode of motion the obstacle vehicle. To predict the path and the mode of motion the obstacle vehicle, an environment predictor configured to predict the path and the mode of motion of the obstacle vehicle is executed.

Further, a safety constraint for the obstacle vehicle is determined based on the predicted path and the mode of motion of the obstacle vehicle. For example, if the predicted mode is the cruising mode, then the safety constraint is determined around the state of the obstacle vehicle along its path. The safety constraint determined around the state of the obstacle vehicle along its path is referred to as a safety margin. The safety margin is determined as the safety constraint for the cruising mode because, in the cruising mode, the obstacle vehicle takes less aggressive steering actions, and its motion can be predicted with relatively high confidence. However, in the maneuvering mode, it is difficult to predict the motion of the obstacle vehicle and the obstacle vehicle tends to occupy a larger space to adjust its orientation. To that end, for the maneuvering mode, the safety constraint is determined as safety bounds in all driving directions around the state of the obstacle vehicle. Thus, if the predicted mode is the maneuvering mode, then the safety bounds are determined for the obstacle vehicle. The safety bounds define an area that the autonomous ego vehicle should avoid if the obstacle vehicle is in the maneuvering mode.

Further, the autonomous ego-vehicle is parked by controlling the autonomous ego-vehicle based on the trajectory and the determined safety constraint.

Some embodiments are based on the realization that the motion of the autonomous ego-vehicle in the parking area may be constantly adapted in response to changes of the parking area environment. Hence, even after the trajectory for the autonomous ego-vehicle is determined, a need to adjust the trajectory may arise at any time. To that end, to control the parking of the autonomous ego-vehicle, some embodiments use a strategic motion planner that varies control strategy based on different situations in the parking area.

For example, in some embodiments, the strategic motion planner uses three different strategies based on different situations. The strategic motion planner includes a model predictive control-based safety controller for trajectory tracking, a search-based retreat planner for finding an evasion path in an emergency, and an optimization-based repair planner for modifying the path of the trajectory. The strategic motion planner strikes a balance between safety, plan feasibility, and smooth maneuvering by leveraging advantages of optimization-based and search-based approaches.

Accordingly, one embodiment discloses an integrated system for parking an autonomous ego-vehicle in a dynamic environment of a parking area. The integrated system comprises a processor; and a memory having instructions stored thereon that, when executed by the processor, cause the integrated system to: collect measurements of a state of the dynamic environment in the parking area indicative of available parking spots in the parking area, a state of one or multiple stationary vehicles parked in the parking area, and a state of one or multiple obstacle vehicles moving in the parking area; execute a path planner configured to produce a trajectory for parking the autonomous ego-vehicle based on the state of the dynamic environment in the parking area; execute an environment predictor configured to predict a path and a mode of motion for each of the obstacle vehicles, wherein the mode of motion includes a first mode of motion or a second mode of motion; determine a safety constraint for each of the obstacle vehicles based on the path and the mode of motion for each of the obstacle vehicles, wherein the safety constraint is determined around the state of an obstacle vehicle along its path if the obstacle vehicle is in the first mode of motion, and wherein the safety constraint is determined in all driving directions around the state of the obstacle vehicle if the obstacle vehicle is in the second mode of motion; and park the autonomous ego-vehicle based on the trajectory for parking and the safety constraint for each of the obstacle vehicles.

Accordingly, another embodiment discloses a method for parking an autonomous ego-vehicle in a dynamic environment of a parking area. The method comprises collecting measurements of a state of the dynamic environment in the parking area indicative of available parking spots in the parking area, a state of one or multiple stationary vehicles parked in the parking area, and a state of one or multiple obstacle vehicles moving in the parking area; executing a path planner configured to produce a trajectory for parking the autonomous ego-vehicle based on the state of the dynamic environment in the parking area; executing an environment predictor configured to predict a path and a mode of motion for each of the obstacle vehicles, wherein the mode of motion includes a first mode of motion or a second mode of motion; determining a safety constraint for each of the obstacle vehicles based on the path and the mode of motion for each of the obstacle vehicles, wherein the safety constraint is determined around the state of an obstacle vehicle along its path if the obstacle vehicle is in the first mode of motion, and wherein the safety constraint is determined in all driving directions around the state of the obstacle vehicle if the obstacle vehicle is in the second mode of motion; and parking the autonomous ego-vehicle based on the trajectory for parking and the safety constraint for each of the obstacle vehicles.

Accordingly, yet another embodiment discloses a non-transitory computer-readable storage medium embodied thereon a program executable by a processor for performing a method for parking an autonomous ego-vehicle in a dynamic environment of a parking area. The method comprises collecting measurements of a state of the dynamic environment in the parking area indicative of available parking spots in the parking area, a state of one or multiple stationary vehicles parked in the parking area, and a state of one or multiple obstacle vehicles moving in the parking area; executing a path planner configured to produce a trajectory for parking the autonomous ego-vehicle based on the state of the dynamic environment in the parking area; executing an environment predictor configured to predict a path and a mode of motion for each of the obstacle vehicles, wherein the mode of motion includes a first mode of motion or a second mode of motion; determining a safety constraint for each of the obstacle vehicles based on the path and the mode of motion for each of the obstacle vehicles, wherein the safety constraint is determined around the state of an obstacle vehicle along its path if the obstacle vehicle is in the first mode of motion, and wherein the safety constraint is determined in all driving directions around the state of the obstacle vehicle if the obstacle vehicle is in the second mode of motion; and parking the autonomous ego-vehicle based on the trajectory for parking and the safety constraint for each of the obstacle vehicles.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
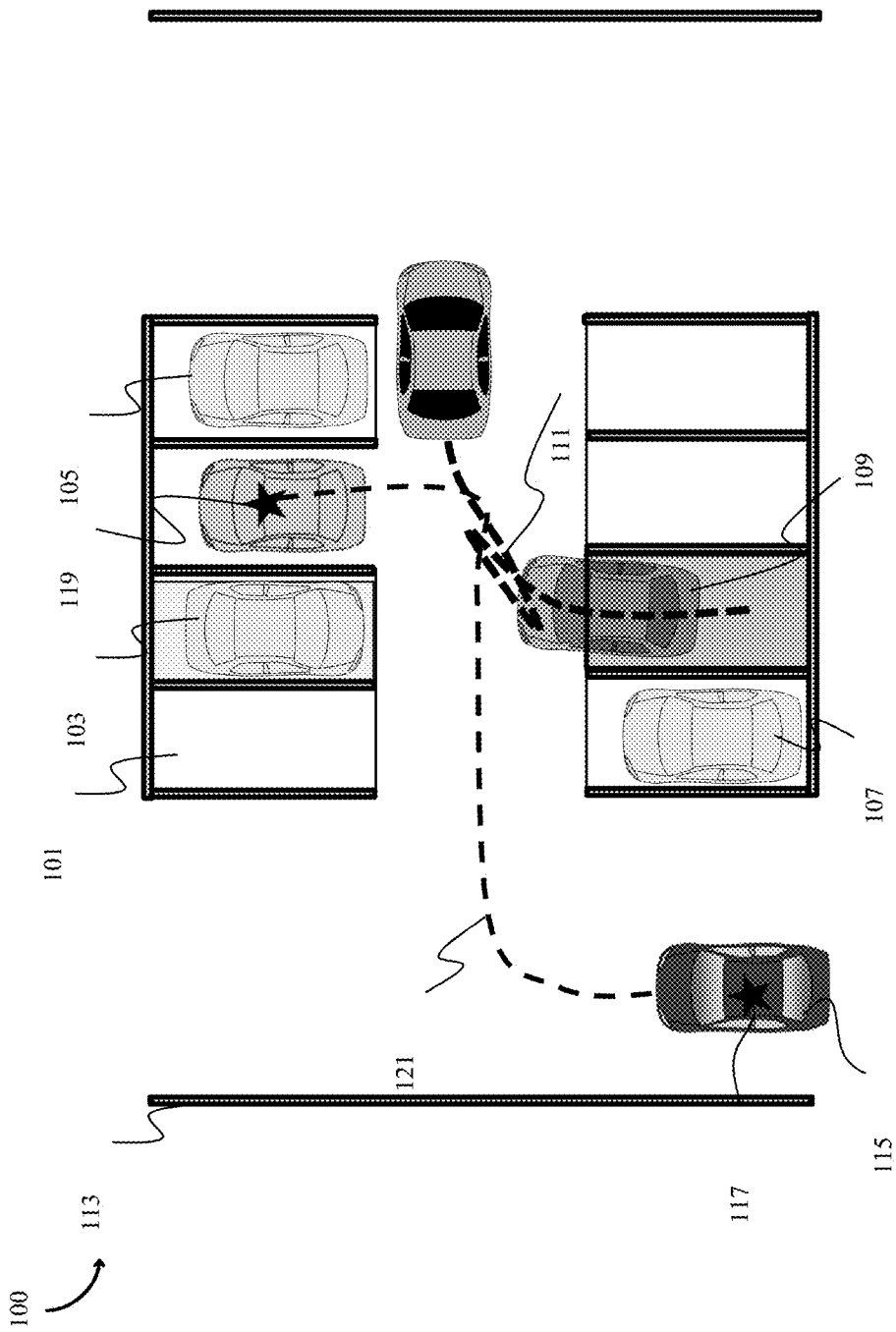
FIG. 1A illustrates an example parking area, according to some embodiments of present disclosure.

FIG. 1A illustrates an example parking area 100, according to some embodiments of present disclosure. The parking area 100 includes parking spots, such as a spot 101, for parking vehicles. The parking area 100 further includes one or multiple stationary vehicles, such as vehicles 103, 105, and 107, parked in the parking area 100, and one or multiple obstacle vehicles moving in the parking area 100, for example, an obstacle vehicle 109. The obstacle vehicle 109 may be leaving the parking area 100 by following a path 111. Additionally, the parking area 100 includes static obstacles such as a wall 113 and/or columns of the parking area 100.

It is an object of some embodiments to park an autonomous ego-vehicle 115 in such a dynamic environment of the parking area 100, without colliding with the stationary vehicles 103, 105, and 107, the obstacle vehicle 109, the wall 113, and other obstacles that may be present in the parking area 100. For example, the autonomous ego-vehicle 115 has an initial state 117 and needs to be parked at a parking spot defined by a target state 119, without colliding with the stationary vehicles 103, 105, and 107, the obstacle vehicle 109, and the wall 113. Each state, e.g., the initial state 117 and the target state 119, defines at least a position (x, y) in a 2D plane and an orientation θ of the autonomous ego-vehicle 115.

To achieve such an objective some embodiments provide a system for parking the autonomous ego-vehicle 115. The system for parking the autonomous ego-vehicle 115 is explained in FIG. 1B.

Figure 1B:
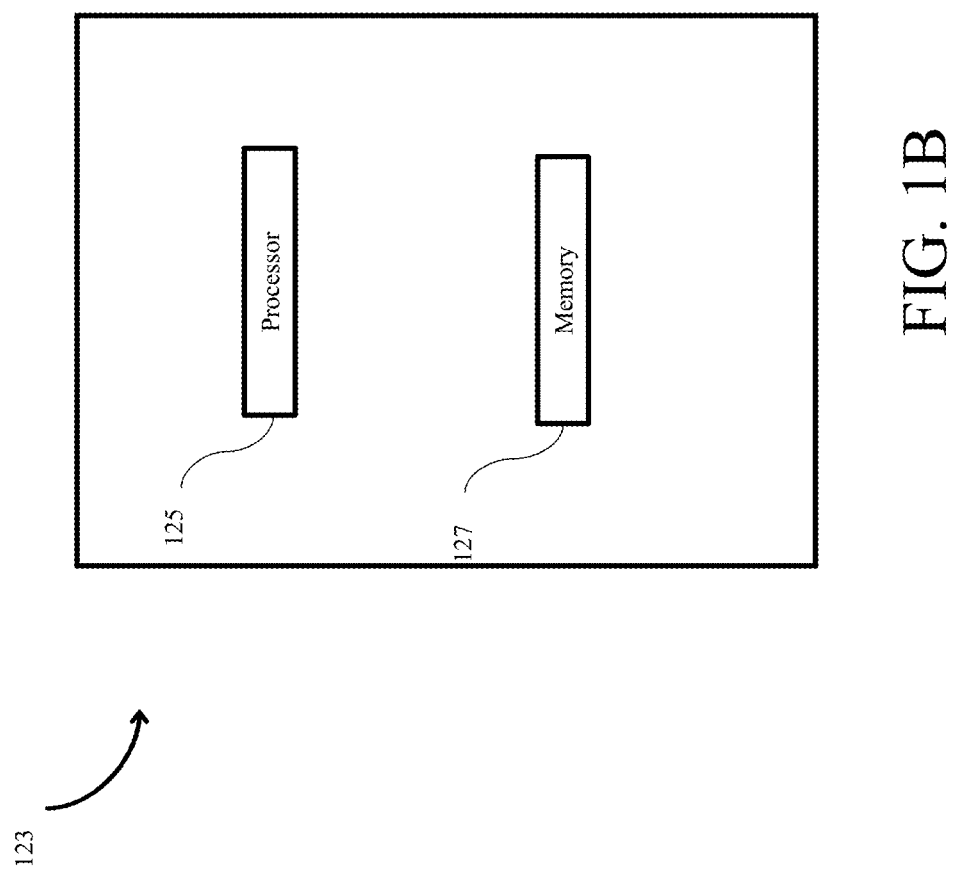
FIG. 1B shows a block diagram of a system for parking an autonomous ego-vehicle, according to an embodiment of the present disclosure.

FIG. 1B shows a block diagram of a system 123 for parking the autonomous ego-vehicle 115, according to an embodiment of the present disclosure. The system 123 includes a processor 125 and a memory 127. The processor 125 may be a single core processor, a multi-core processor, a computing cluster, or any number of other configurations. The memory 127 may include random access memory (RAM), read only memory (ROM), flash memory, or any other suitable memory systems. Additionally, in some embodiments, the memory 127 may be implemented using a hard drive, an optical drive, a thumb drive, an array of drives, or any combinations thereof. In an embodiment, the system 123 may be integrated into the autonomous ego-vehicle 115. The processor 125 is configured to execute various functions to park the autonomous ego-vehicle 115, as explained in FIG. 1C.

Figure 1C:
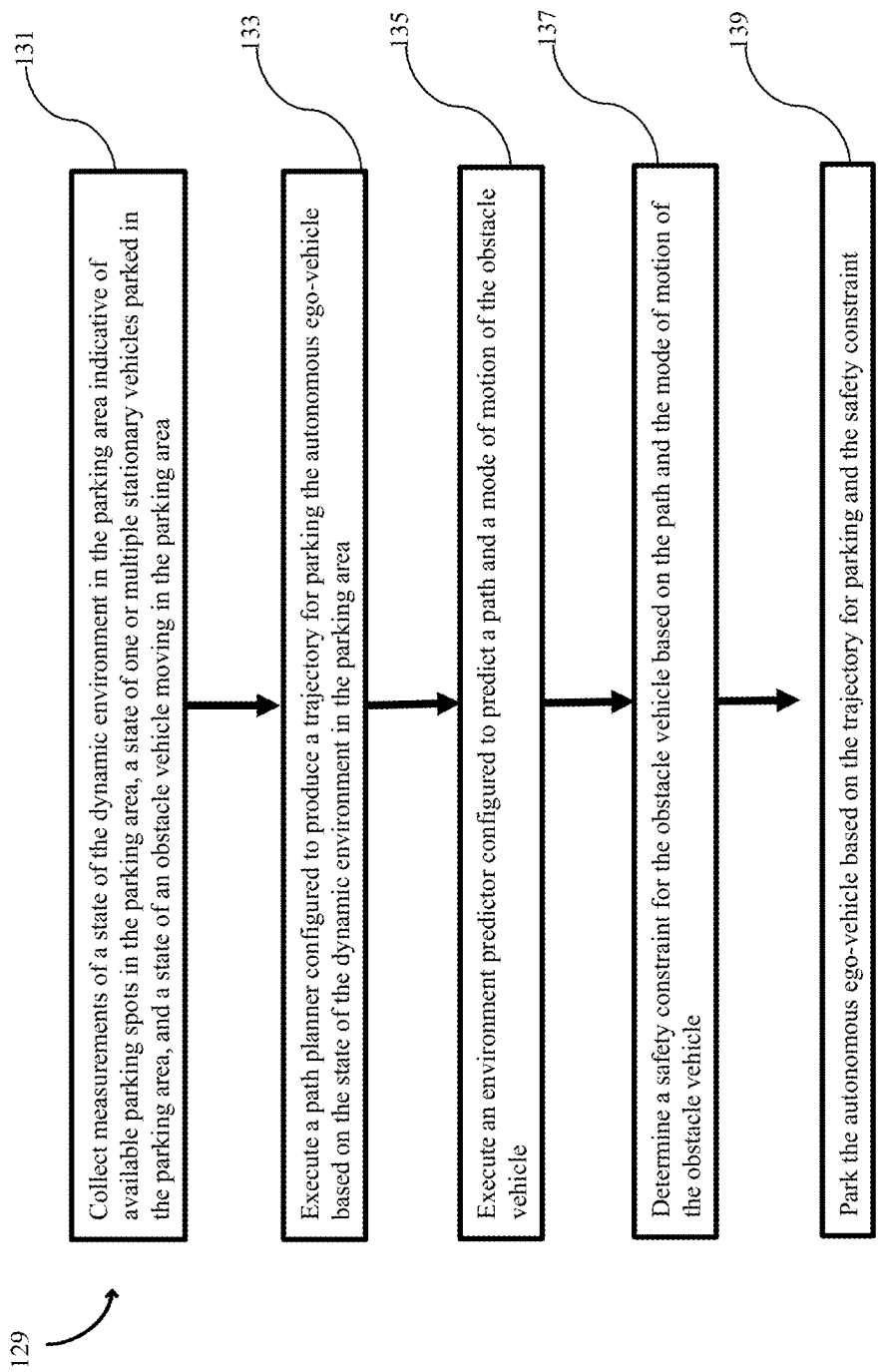
FIG. 1C shows a block diagram of a method for parking the autonomous ego-vehicle in a dynamic environment of the parking area, according to an embodiment of the present disclosure.

FIG. 1C shows a block diagram of a method 129 for parking the autonomous ego-vehicle 115 in the dynamic environment of the parking area 100, according to an embodiment of the present disclosure. At block 131, the processor 125 collects measurements of a state of the dynamic environment in the parking area 100 indicative of available parking spots in the parking area 100, a state of each of the stationary vehicles 103, 105, and 107, and a state of the obstacle vehicle 109. In an embodiment, the state of the obstacle vehicle 109 may include a position and an orientation of the obstacle vehicle 109, and geometric information of the obstacle vehicle 109, for example, its wheelbase.

At block 133, the processor 125 executes a path planner configured to produce a trajectory for parking the autonomous ego-vehicle 115 based on the state of the dynamic environment in the parking area 100. For example, the processor 125 executes the path planner to produce a trajectory 121, shown in FIG. 1A, for parking the autonomous ego-vehicle 115 at the target state 119. In an embodiment, the path planner may be stored in the memory 127.

Figure 1D:
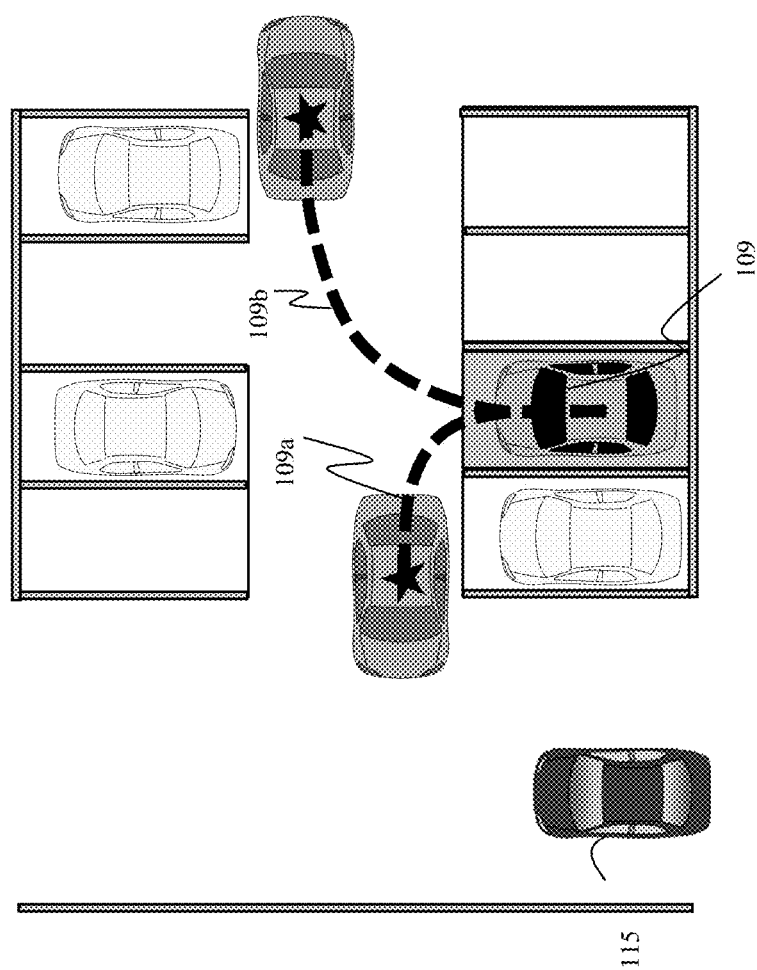
FIG. 1D shows a schematic illustrating different paths along which an obstacle vehicle may traverse to exit the parking area, according to an embodiment of the present disclosure.

Some embodiments are based on the realization that motion of the obstacle vehicle 109 needs to be considered for achieving collision-free parking of the autonomous ego-vehicle 115 in the parking area 100. To that end, some embodiments aim to predict a path of the obstacle vehicle 109. FIG. 1D shows a schematic illustrating different paths along which the obstacle vehicle 109 may traverse to exit the parking area 100, according to an embodiment of the present disclosure. The obstacle vehicle 109 may, for example, traverse along a path 109*a* and or a path 109*b*.

Some embodiments are based on realization that, considering the dynamic environment of the parking area 100, it is insufficient to predict only the path of the obstacle vehicle 109, it is also useful to determine a mode of the motion of the obstacle vehicle 109. Some embodiments are based on observation that the obstacle vehicle 109 runs in various modes in the parking area 100, such as a cruising mode and a maneuvering mode. In the cruising mode, the obstacle vehicle 109 has small or steady steering angles. The obstacle vehicle 109 runs in the cruising mode when the obstacle vehicle 109 enters the parking area 100 and is approaching a parking spot or when the obstacle vehicle 109 is exiting the parking area 100. The cruising mode is also referred to as a first mode. In the maneuvering mode, the obstacle vehicle 109 changes the steering angle frequently and deviates from its path to park or leave narrow parking spot. The maneuvering mode is also referred to as a second mode.

To that end, it is an objective of some embodiments to predict both the path and the mode of motion the obstacle vehicle 109. To predict the path and the mode of motion the obstacle vehicle 109, at block 135, the processor 125 executes an environment predictor configured to predict the path and the mode of motion of the obstacle vehicle 109. In an embodiment, the environment predictor may be stored in the memory 127.

Figure 1E:
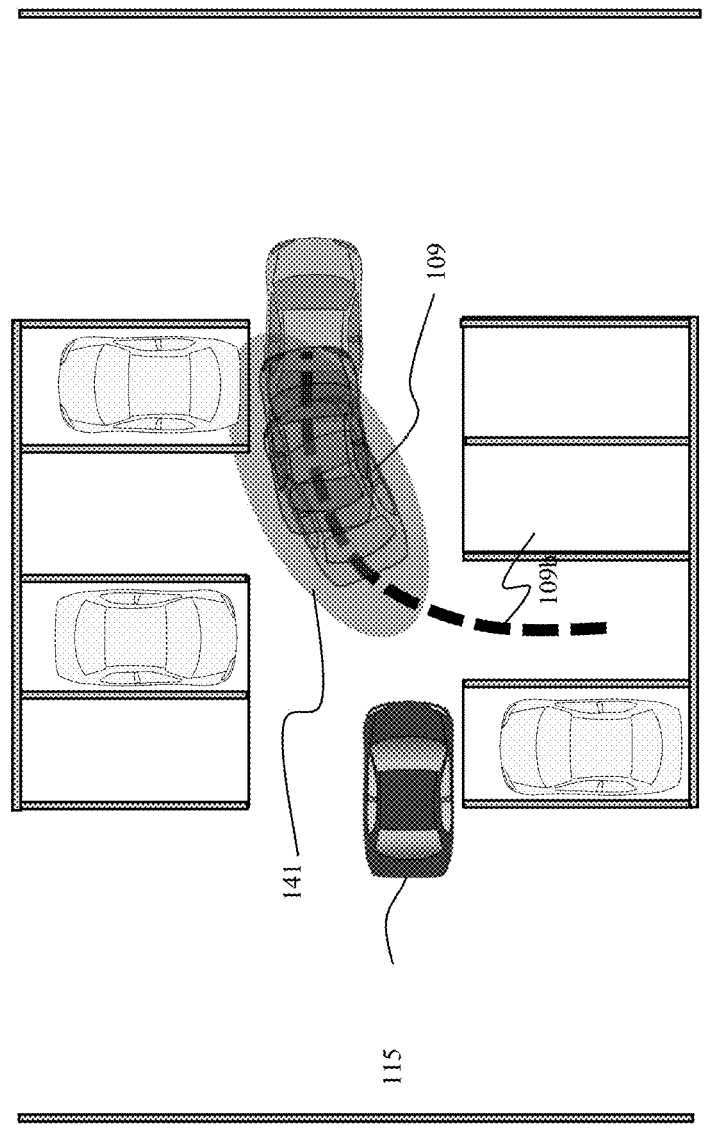
FIG. 1E shows a schematic illustrating a safety margin determined around the state of the obstacle vehicle along its path, according to an embodiment of the present disclosure.

Further, at block 137, the processor 125 determines a safety constraint for the obstacle vehicle 109 based on the predicted path and the mode of motion of the obstacle vehicle 109. For example, if the predicted path is the path 109*b* and the predicted mode is the cruising mode, then the safety constraint is determined around the state of the obstacle vehicle 109 along its path. The safety constraint determined around the state of the obstacle vehicle 109 along its path is referred to as a safety margin. FIG. 1E shows a schematic illustrating a safety margin 141 determined around the state of the obstacle vehicle 109 along its path 109*b*, according to an embodiment of the present disclosure. The safety margin 141 is determined as the safety constraint for the cruising mode because, in the cruising mode, the obstacle vehicle 109 takes less aggressive steering actions, and its motion can be predicted with relatively high confidence. However, in the maneuvering mode, it is difficult to predict the motion of the obstacle vehicle 109 and the obstacle vehicle 109 tends to occupy a larger space to adjust its orientation. To that end, for the maneuvering mode, the safety constraint is determined as safety bounds in all driving directions around the state of the obstacle vehicle 109.

Figure 1F:
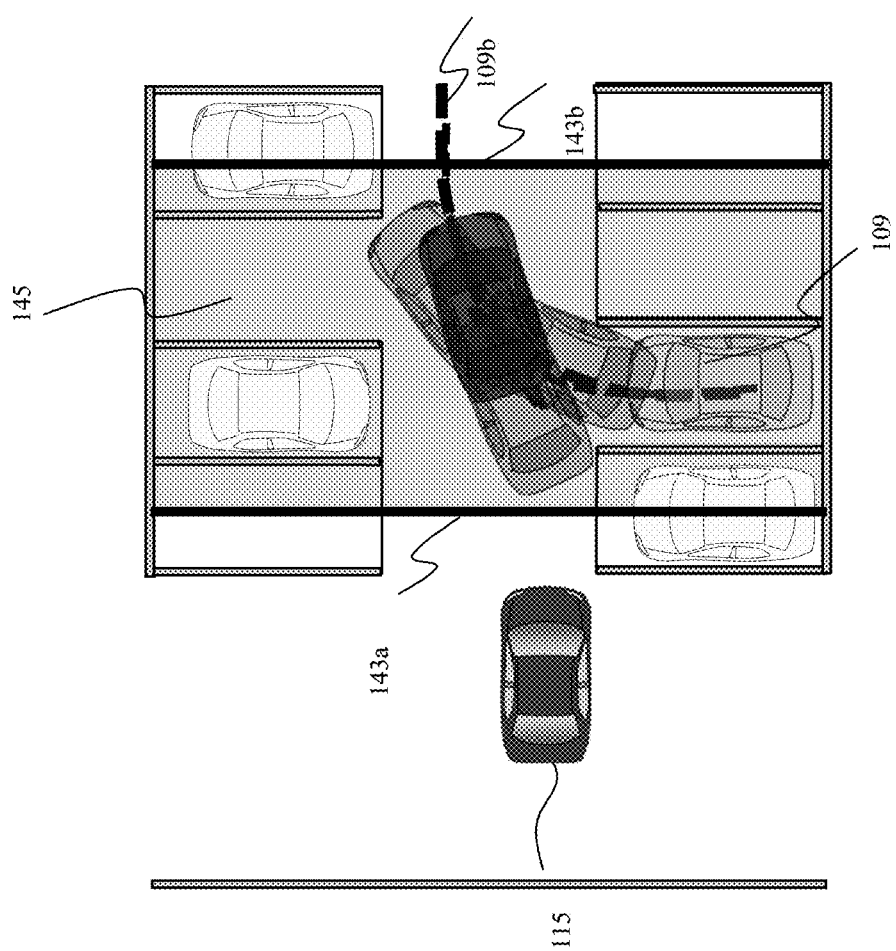
FIG. 1F shows a schematic illustrating safety bounds, according to an embodiment of the present disclosure.

Thus, for example, if the predicted path is the path 109*b* and the predicted mode is the maneuvering mode, then the safety bounds are determined for the obstacle vehicle 109. FIG. 1F shows a schematic illustrating safety bounds 143*a* and 143*b*, according to an embodiment of the present disclosure. The safety bounds 143*a* and 143*b* define an area 145 that the autonomous ego vehicle 115 should avoid if the obstacle vehicle 109 is traversing the path 109*b* in the maneuvering mode.

Further, at block 139, the processor 125 parks the autonomous ego-vehicle 115 by controlling the autonomous ego-vehicle 115 based on the trajectory 121 and the determined safety constraint.

According to an embodiment, the trajectory 121 may be determined based on a kinematic model of the autonomous ego-vehicle 115 that describes a motion of the autonomous ego-vehicle 115 without consideration of a mass/inertia of the autonomous ego-vehicle 115 or forces/torques that caused the motion. One example of such a kinematic model is given by $$\dot{x}=\cos(\theta)u_1$$
$$\dot{y}=\sin(\theta)u_1$$
$$\dot{\theta}=u_1 u_2, \qquad (1)$$

where (x, y) coordinates of a midpoint of a rear wheel-axis, θ an orientation of the autonomous ego-vehicle 115, $u_1$ a velocity of the midpoint of the rear wheel axis (named after longitudinal velocity of the autonomous ego-vehicle 115), and $u_2=\tan(\delta)/b$ with δ an angle between front wheels and the orientation, b a distance between (x, y) and the midpoint of the front wheels (or called wheelbase). Without loss of generality, $u_2$ is referred as a (normalized) steering angle.

In some embodiments, the kinematic model can include an additional state variable to ensure continuous curvature. In another embodiment, the kinematic model can include a longitudinal velocity, a steering angle, and a steering angle rate as additional state variables.

In some embodiments, the motion of the autonomous ego-vehicle 115, specifying how fast the autonomous ego-vehicle 115 moves along the path, is determined based on a dynamic model of the autonomous ego-vehicle 115. As used herein, the dynamic model of the autonomous ego-vehicle 115 accounts for time-dependent changes in the state of the autonomous ego-vehicle 115. The dynamic models are represented by ordinary differential equations. In one embodiment, the dynamic model of the autonomous ego-vehicle 115 is fifth order differential equation:

$$\begin{aligned} \dot{x} &= \cos(\theta)v \\ \dot{y} &= \sin(\theta)v \\ \dot{\theta} &= \frac{v\tan(\delta)}{b}, \\ \dot{v} &= a \\ \dot{\delta} &= v_s \end{aligned} \qquad (2)$$

where a is a longitudinal acceleration, and $v_s$ is the steering rate (steering angular velocity).

A path/motion is kinematically feasible if it is a solution of the kinematic model (1). An autonomous ego-vehicle state $X=(x, y, \theta)$ is collision free only if the autonomous ego-vehicle 115 located at X does not collide with any obstacle. All collision free vehicle states constitute a collision free configuration space $\mathcal{C}_{free}$. The initial state 117 is abbreviated as $X_0=(x_0, y_0, \theta_0)$, and the target state 119 is denoted by $X_f=(x_f, y_f, \theta_f)$. For a specific parking task with a parking area represented by a rectangle L×H, the autonomous ego-vehicle state belongs to a state space $\mathcal{X}$: [0, L]×[0, H]×[0, 2π).

In some embodiments, a path/motion is generated according to the dynamic model (2). A dynamically feasible path/motion is a solution of the dynamic model (2). Accordingly, an autonomous ego-vehicle state is $X=(x, y, \theta, v, \delta)$. Since a vehicle typically starts and ends with zero velocity and steering angle, thus the initial state 117 and the target state 119 for the dynamic model (2) are $X_0=(x_0, y_0, \theta_0, 0, 0)$ and $X_f=(x_f, y_f, \theta_f, 0, 0)$, respectively.

According to an embodiment, the path of the obstacle vehicle 109 can be determined based on a position and a velocity of the obstacle vehicle 109. However, some embodiments are based on the realization that the position and the velocity is insufficient to estimate the modes of the motion of the obstacle vehicle 109. This is because a vehicle at the same position and having the same velocity at any instance of time can be in different modes. To that end, some embodiments are based on the realization that the steering angle can be more indicative of the modes of the motion because for obstacle vehicle 109 in the cruising mode the steering angle is more aligned with the velocity and/or orientation of the obstacle vehicle 109 than the steering angle of the obstacle vehicle 109 in the maneuvering mode.

Therefore, in some embodiments, the environment predictor estimates the position, the velocity, and the steering angle of the obstacle vehicle 109 at different instances of time and estimates the path of the obstacle vehicle 109 based on the position and the velocity of the obstacle vehicle 109 at the different instances of time. The environment predictor further estimates the mode of the motion of the obstacle vehicle 109 based on the steering angle of the obstacle vehicle 109 at the different instances of time. Additionally, or alternatively, in some embodiments, the environment predictor determines the mode of the motion of the obstacle vehicle 109 based on a misalignment of the orientation of the obstacle vehicle 109 and the steering angle at the different instances of time. The environment predictor used to determine the path and the mode of motion of the obstacle vehicle 109 is explained in detail below in FIG. 2.

Figure 2:
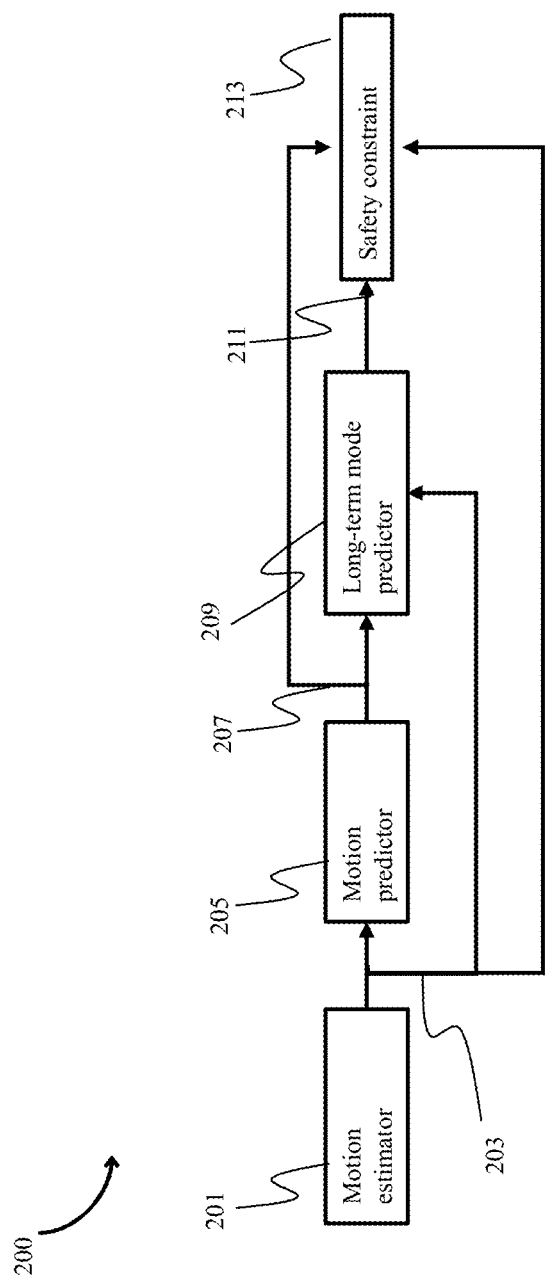
FIG. 2 shows a schematic of an environment predictor, according to an embodiment of the present disclosure.

FIG. 2 shows a schematic 200 of the environment predictor, according to an embodiment of the present disclosure. Based on measurements, a motion estimator 201 estimates a current state 203 of the obstacle vehicle 109, and a motion predictor 205 predicts a path 207 over a finite time horizon. The measurements include one or a combination of the target state 119, map information, the position, and the orientation of the obstacle vehicle 109, and the geometric information of the obstacle vehicle 109. Further, based on the current state 203 and the predicted path 207, a long-term mode predictor 209 determines a probability 211 of each mode that the obstacle vehicle 109 possibly belongs to. Further, based on the current state 203 and the predicted path 207, and the mode probability 211, the processor 125 determines a safety constraint 213.

In some embodiments, the motion estimator 201 can be realized by implementing an Extended Kalman Filter (EKF) based on discretization of the following continuous-time unicycle model $$\dot{x}=v\cos\theta+q_1$$

$$\dot{y}=v\sin\theta+q_2$$

$$\dot{\theta}=\omega+q_3$$

$$\dot{v}=q_4$$

$$\dot{\omega}=q_5$$

$$z=[x+r_1, y+r_2, \theta+r_3]^T, \quad (3)$$

where ω represents a yaw rate of obstacle vehicle 109, and $q_i$, $1\leq i\leq 5$ are Gaussian processes, with zero mean and certain covariances, representing model uncertainties, and r, $1\leq i\leq 3$ are Gaussian processes, with zero mean and certain covariances, representing measurement noises. An output of the EKF, e.g., the estimated current state 203, is denoted by ($\hat{x}$, $\hat{y}$, $\hat{\theta}$, $\hat{v}$, $\hat{\omega}$). Some embodiments are based on recognition that it is computationally advantageous to use two EKFs. One EKF estimates (x, y, v) based on measurement of (x, y), and another EKF estimates (θ, ω) based on measurement (θ, $\hat{v}$). However, performing motion estimation, or the motion estimator 201, based on the model (3) implicitly restricts the constant velocity and yaw rate over the entire prediction time horizon to obtain the predicted path 207 of the obstacle vehicle 109, and thus a mean of the predicted path 207 is always a circle in the 2D plane.

In some embodiments, the motion estimator 201 can be realized based on discretization of the following continuous-time bicycle model $$\begin{aligned}\dot{x} &= v\cos\theta+q_1 \\ \dot{y} &= v\sin\theta+q_2 \\ \dot{\theta} &= \frac{\tan(\delta)}{L}v+q_3 \\ \dot{v} &= q_4 \\ \dot{\delta} &= q_5 \\ z &= [x+r_1, y+r_2, \theta+r_3]^T\end{aligned} \quad (4)$$

where δ represents the steering angle of the obstacle vehicle 109, and $q_i$, $1\leq i\leq 5$ are Gaussian processes representing model uncertainties, and r, $1\leq i\leq 3$ are Gaussian processes representing measurement noises. Given the nonlinear model (4), state estimators such as EKF or particle filter are applied for the state estimation. Some embodiments are based on an observation that it is not straightforward to tune the EKF for accurate estimation of the steering angle. This is partially attributed to term v tan(δ) which involves multiplication of unmeasured states. Meanwhile, heavy computation also presents a hurdle for the adoption of the particle filter.

To address such shortcomings, some embodiments provide the motion estimator 201 based on a multi-stage estimation framework. The motion estimator 201 based on the multi-stage estimation framework is explained below in FIG. 3A.

Figure 3A:
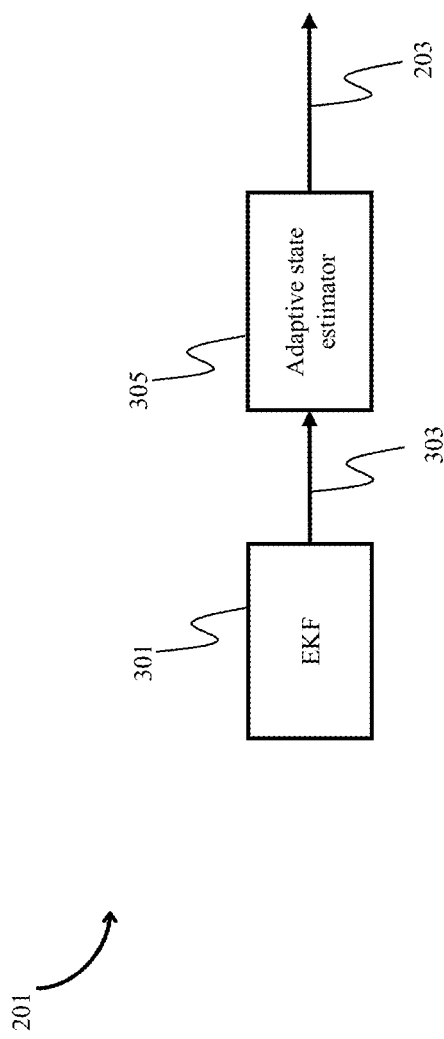
FIG. 3A shows a schematic of a motion estimator based on a multi-stage estimation framework, according to an embodiment of the present disclosure.

FIG. 3A shows a schematic of the motion estimator 201 based on the multi-stage estimation framework, according to an embodiment of the present disclosure. An EKF 301 is configured to estimate (x, y, v) of the obstacle vehicle 109, based on the measurements and a partial dynamic model given by $\dot{x} = v \cos\theta + q_1$ $\dot{y} = v \sin\theta + q_2$ $\dot{v} = q_4$ $z = [X+r_1, y+r_2, \theta+r_3]^T.$  (5)

In an embodiment, the EKF 301 integrates measurements of the position of the obstacle vehicle 109 to estimate the velocity of the obstacle vehicle 109. Thus, the EKF 301 outputs an estimate 303 denoted as ($\hat{x}$, $\hat{y}$, $\hat{v}$). Further, the estimations of the velocity at the different instances of time may be integrated forward in time to produce estimations of the steering angle at the different instances of time. Specifically, in an embodiment, the estimate 303 drives an adaptive state estimator 305 to estimate the steering angle based on the following model $$\dot{\theta} = \frac{\tan(\delta)}{L}v$$
$$\dot{\delta} = 0$$  (6)
$$z = [\theta, \hat{v}]^T$$

The adaptive state estimator's 305 output is denoted as ($\hat{\theta}$, $\hat{\delta}$). The estimate of the current state 203 of the obstacle vehicle 109 is a combination of the estimate 303 and the adaptive state estimator output, i.e., ($\hat{x}$, $\hat{y}$, $\hat{\theta}$, $\hat{v}$, $\hat{\delta}$), where in some embodiments, $\hat{\theta}$ is from the EKF 301, and in another embodiment $\hat{\theta}$ is from the adaptive state estimator 305. It is noteworthy that this model, capturing explicit nonlinearity in $\theta$-dynamics, offers a better prediction performance than the estimation based on assuming $\dot{\theta}=\omega=$constant.

Another embodiment is based on the realization that it is not valid to assume constant velocity and steering angle of the obstacle vehicle 109 over a specified prediction horizon. Such an assumption is particularly inadequate to characterize future motion when the obstacle vehicle 109 is parking, where frequent changes of moving direction (involves lots of acceleration and deceleration) and steering actions (involving non-constant steering velocity) are anticipated. To accurately predict a short-term motion of the obstacle vehicle 109 and thus improve a confidence of successive mode estimation, it is advantageous to reconstruct a control input u, including the longitudinal acceleration a and a steering velocity $v_s$.

To that end, some embodiments provide the motion estimator 201 based on the following dynamic model of the obstacle vehicle 109

$$\dot{x} = v\cos\theta + q_1$$
$$\dot{y} = v\sin\theta + q_2$$
$$\dot{\theta} = sv + q_3$$
$$\dot{v} = a + q_4$$  (7)
$$\dot{s} = Ls^2 v_s + q_5$$
$$\dot{a} = q_6$$
$$\dot{v}_s = q_7$$
$$z = [x+r_1, y+r_2, \theta+r_3]^T$$

where $s = \frac{\tan(\delta)}{L}$, and $q_6$, $q_7$ are Gaussian processes with zero mean and certain covariances. A multi-stage framework, similar to the multi-stage framework described in FIG. 3A, is employed to solve the motion estimation based on the dynamic model (7).

Figure 3B:
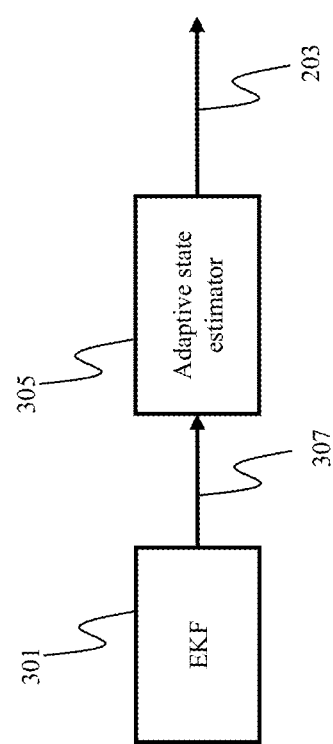
FIG. 3B shows a schematic for motion estimation based on a dynamic model, according to an embodiment of the present disclosure.

FIG. 3B shows a schematic for the motion estimation based on the dynamic model (7), according to an embodiment of the present disclosure. The EKF 301 estimates (x, y, v, a) based on discretization of the dynamic model $\dot{x} = v \cos\theta + q_1$ $\dot{y} = v \sin\theta + q_2$ $\dot{v} = a + q_4$ $\dot{a} = q_6$ $z = [X+r_1, y+r_2, \theta+r_3]^T.$  (8)

Thus, the EKF 301 outputs an estimate 307 denoted as ($\hat{x}$, $\hat{y}$, $\hat{v}$, $\hat{a}$). The adaptive state estimator 305, addressing nonlinearity in $\theta$ and s-dynamics, performs estimation based on the rest dynamic model $\dot{\theta} = sv$ $\dot{s} = Ls^2 v_s$ $\dot{v}_s = 0$ $z = [\hat{\theta}, \hat{v}]^T.$  (9)

The adaptive state estimator 305 produces an estimate ($\hat{\theta}$, $\hat{s}$, $\hat{v}_s$). The estimate of the current state 203 of the obstacle vehicle 109 is a combination of the estimate 307 and the estimate ($\hat{\theta}$, $\hat{s}$, $\hat{v}_s$), i.e., ($\hat{x}$, $\hat{y}$, $\hat{\theta}$, $\hat{v}$, $\hat{a}$, $\hat{s}$, $\hat{v}_s$), where in some embodiments, $\hat{\theta}$ in the current state 203 is from the EKF 301, and in another embodiment $\hat{\theta}$ in the current state 203 is from the adaptive state estimator 305. In some embodiments, the adaptive state estimator 305, adopting the multi-stage framework, first estimates s based on $\hat{v}$, $\hat{\theta}$ from the EKF 301, and then estimates $v_s$ based on the dynamics of s, $v_s$, while treating $\hat{s}$ as a measurement. By estimating control actions $v_s$, a along with (x, y, $\theta$, v, $\delta$), the path of the obstacle vehicle 109 can be predicted accurately.

Figure 3C:
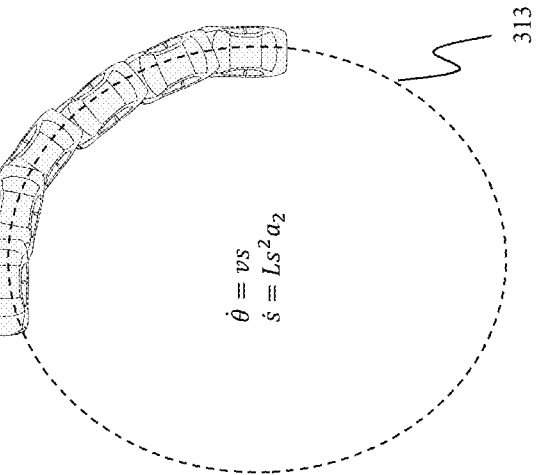
FIG. 3C shows schematics of paths of an obstacle vehicle predicted using different models, according to an embodiment of the present disclosure.
Figure 3C:
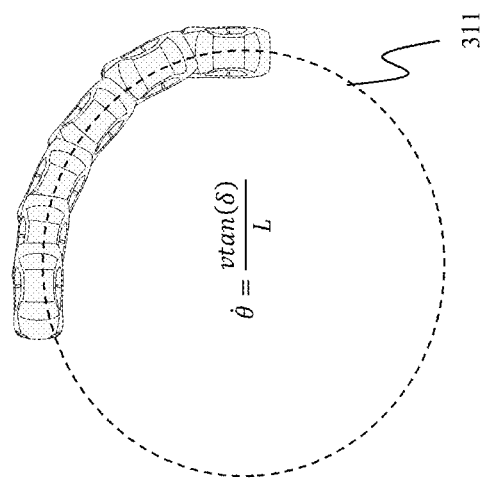
Figure 3C:
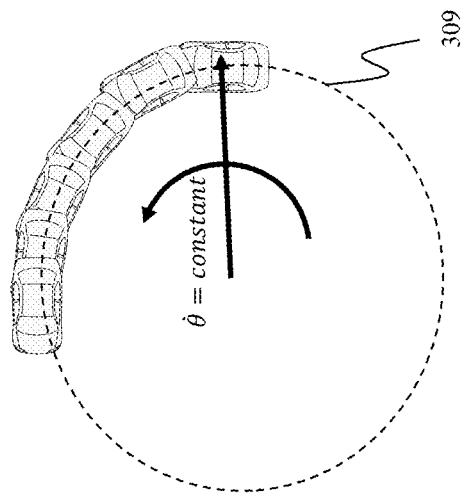

FIG. 3C shows schematics of paths of the obstacle vehicle 109 predicted using different models, according to an embodiment of the present disclosure. An example path predicted using the unicycle model (3) is represented by 309. An example path predicted using the bicycle model (4) is represented by 311. An example path predicted using the dynamic model (7) is represented by 313.

In an embodiment, the EKF 301 and the adaptive state estimator 305 are used to estimate a state [x, y, $\theta$, $\delta$, v]$^T$ of the obstacle vehicle 109, based on the bicycle model (4). Here, the EKF 301 is based on the following discrete-time model (obtained by applying Euler discretization method):

$$\begin{bmatrix} x_{k+1} \\ y_{k+1} \\ \theta_{k+1} \\ v_{k+1} \\ \omega_{k+1} \end{bmatrix} = \begin{bmatrix} x_k + v_k T_s \cos(\theta_k) \\ y_k + v_k T_s \sin(\theta_k) \\ \theta_k + T_s \omega_k \\ v_k \\ \omega_k \end{bmatrix} + q_k, \quad q_k \sim \mathcal{N}(0, Q),$$  (10)

$$z_k = X_{OV,k} + r_k,$$

where k is time step, q is disturbance, $z_k = [z_{x,k}, z_{y,k}, z_{\theta,k}]^T$ is measurement at the time step k, $X_{OV,k} = [x_k, y_k, \theta_k]^T$, and $r_k$ is zero mean Gaussian processes. The EKF 301 outputs $X_{EKF,k} = [\hat{x}_k, \hat{y}_k, \hat{\theta}_k, \hat{v}_k, \hat{\omega}_k]^T$. Estimation of the steering angle is based on the following continuous-time model $\dot{\theta} = vs, \quad z_\theta = \theta,$  (11)

where $z_\theta$ is the measurement and $$s = \frac{\tan\delta}{L}.$$

Further, the adaptive state estimator 305 can be designed as follows:

$$\dot{M}=-gM+\hat{v},$$

$$\dot{\hat{s}}=\lambda M(z_\theta-\hat{\theta}_\alpha),$$

$$\dot{\hat{\theta}}_a=\hat{s}v+g(z_\theta-\hat{\theta}_a+M\dot{\hat{s}}, \quad (12)$$

where M is an auxiliary signal, $g, \lambda \in \mathcal{R}$ are tuning gains, $\hat{\theta}_a$ is an estimated heading angle, and $\hat{v}$ is a velocity estimated by the EKF 301. The estimated steering angle can be calculated with $\hat{s}$, i.e., $\hat{\delta}=\tan^{-1}(\hat{s}L)$. An output of the adaptive state estimator 305 is denoted as $X_{cc,k}=[\hat{x}_k, \hat{y}_k, \hat{\theta}_k, \hat{\delta}_k, \hat{v}_k]^T$. In another embodiment, the output of the adaptive state estimator 305 is $X_{cc,k}=[\hat{x}_k, \hat{y}_k, \hat{\theta}_k, \hat{\delta}_k, \hat{v}_k, \hat{a}_k, \hat{v}_{sk}]^T$, where $\hat{a}_k$ and $\hat{v}_{sk}$ denote an estimated longitudinal acceleration (control action) and steering velocity at the kth time step, respectively.

For the sake of computation efficiency, it is assumed the short-term motion of the obstacle vehicle 109 is fully captured by a mean value of $X_{cc}$ and its covariance. For the mean value, the estimated current state 203 is propagated forward, based on its dynamic model, and a short-term motion prediction $X_{H,k}=[X_{1,k}^T, \ldots, X_{H,k}^T]^T$ for future H steps of the time horizon is obtained. Similarly, forward propagation is conducted to obtain covariance matrices $Pm_{H,k}=\{Pm_{k+1}, \ldots, Pm_{k+H}\}$ according to EKF's forward prediction formula.

Figure 3D:
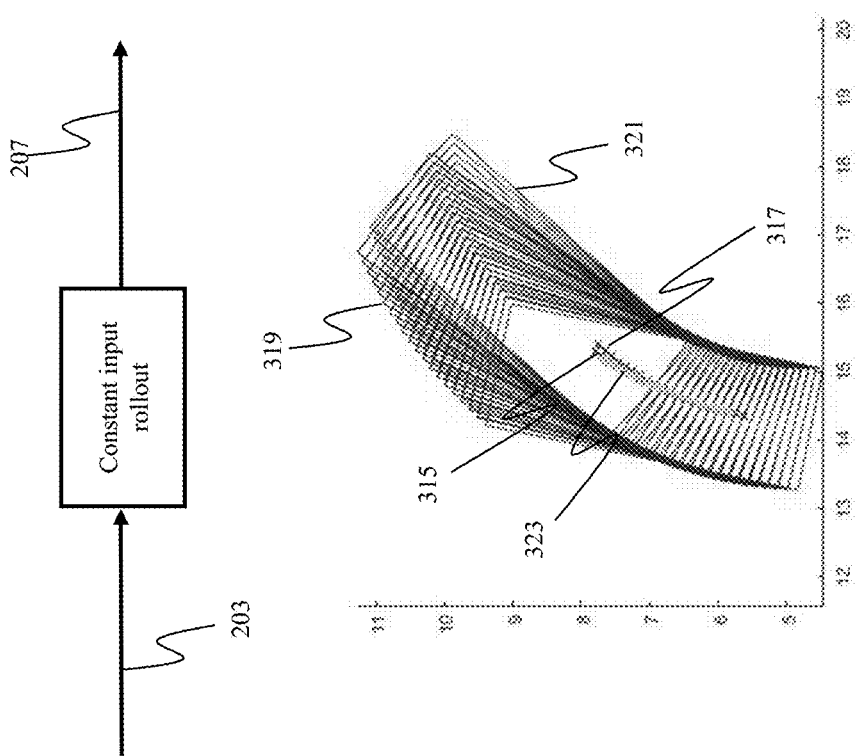
FIG. 3D illustrates an example short-term motion prediction result using a bicycle model and an example short-term motion prediction result using a unicycle model, according to an embodiment of the present disclosure.

FIG. 3D illustrates an example short-term motion prediction result 315 based on the bicycle model and an example short-term motion prediction result 317 based on the unicycle model, according to an embodiment of the present disclosure. Bounding box footprints are 319 and 321. A prediction deviation from ground truth 323 is smaller when using constant steering provided by the bicycle model than when using constant yaw rate provided by the unicycle model. For example, one embodiment uses a kinematic simulator that takes constant inputs and records the state-changes throughout a period of time.

Some embodiments are based on the realization that a long-term motion of the obstacle vehicle 109 in the parking area 100 can be characterized by possible paths (including 201a and 201b as an example), possible modes (maneuvering or cruising for each path), and a probability of the obstacle vehicle 109 following a certain mode. Combining the path and mode information, the obstacle vehicle 109 that has N possible paths to follow may have 2N possible modes. According to an embodiment, prediction of the long-term motion, at the k time step, corresponds to estimation of the probability of each mode by the long-term mode predictor 209.

Figure 4A:
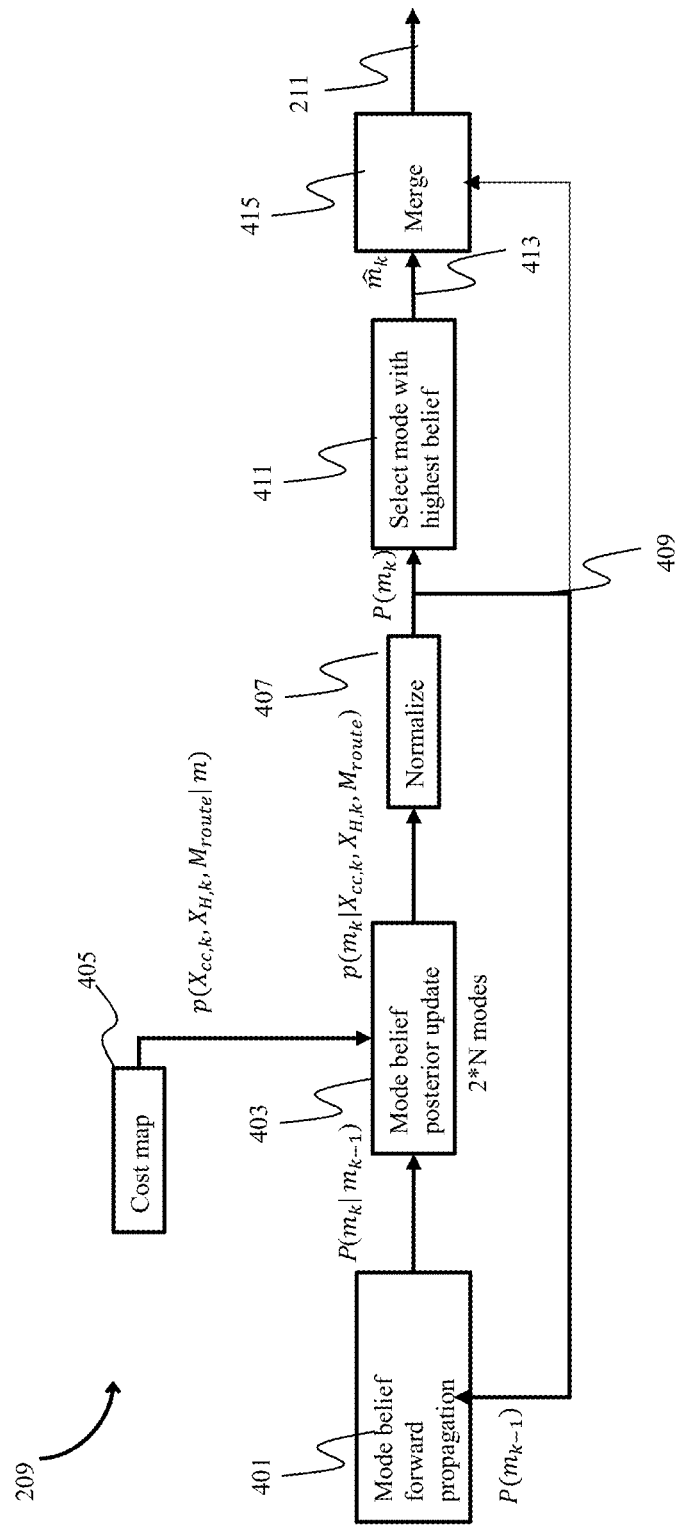
FIG. 4A shows a schematic of the long-term mode predictor for estimation of a probability of each mode, according to an embodiment of the present disclosure.

FIG. 4A shows a schematic of the long-term mode predictor 209 for the estimation of the probability of each mode, according to an embodiment of the present disclosure. The long-term motion prediction, at the k time step, corresponds to estimation of the probability of each mode m based on the current state 203 and the predicted path 207, belief about mode probability $b(m_{k-1})$ at prior time step, a mode belief forward propagation matrix $p(m_k|m_{k-1})$, and a conditional probability of the current state 203 and the predicted path 207 given mode m.

To determine the mode m that the obstacle vehicle 109 belongs to at time step k, i.e., $m_k$, Bayesian framework is employed to keep track of a belief of each mode, i.e., $b(m_k)$. At block, 401, the processor 125 performs mode belief forward propagation to determine the mode belief forward propagation matrix $p(m_k|m_{k-1})$. At block 403, the processor 125 performs mode belief posterior update, based on a cost map 405 and the mode belief forward propagation matrix $p(m_k|m_{k-1})$, to determine a posterior probability distribution $p(m_k|X_{cc,k}, X_{H,k}, M_{route})$. The cost map 405 is used to exploit the obstacle vehicle 109's relative movement against parking area environment and capture possible long-term movements of the obstacle vehicle 109. The posterior probability distribution $p(m_k|X_{cc,k}, X_{H,k}, M_{route})$ is proportional to the prior multiplied with the conditional probability of the current state 203 and the predicted path 207 given mode, i.e., $p(m_k)p(X_{cc,k}, X_{H,k}|m_k)$. Further, at block 407, the processor 125 normalizes the posterior probability distribution to obtain $P(m_k)$ 409, based on which, at block 411, the processor 125 selects a value of $m_k$ with the highest belief to be the mode $\hat{m}_k$ 413 of the obstacle vehicle 109. Further, in some embodiments, at block 415, $P(m_k)$ 409 and the mode $\hat{m}_k$ 413 are merged as the mode probability 211 for determining a safety set. The determination of the safety set is explained in detail FIG. 5. For example, the safe area where the car can occupy, i.e., the area excluding the spaces enclosed by the safety margin and the safety bounds. In some embodiments, the safe set is represented as safety constraints.

Figure 4B:
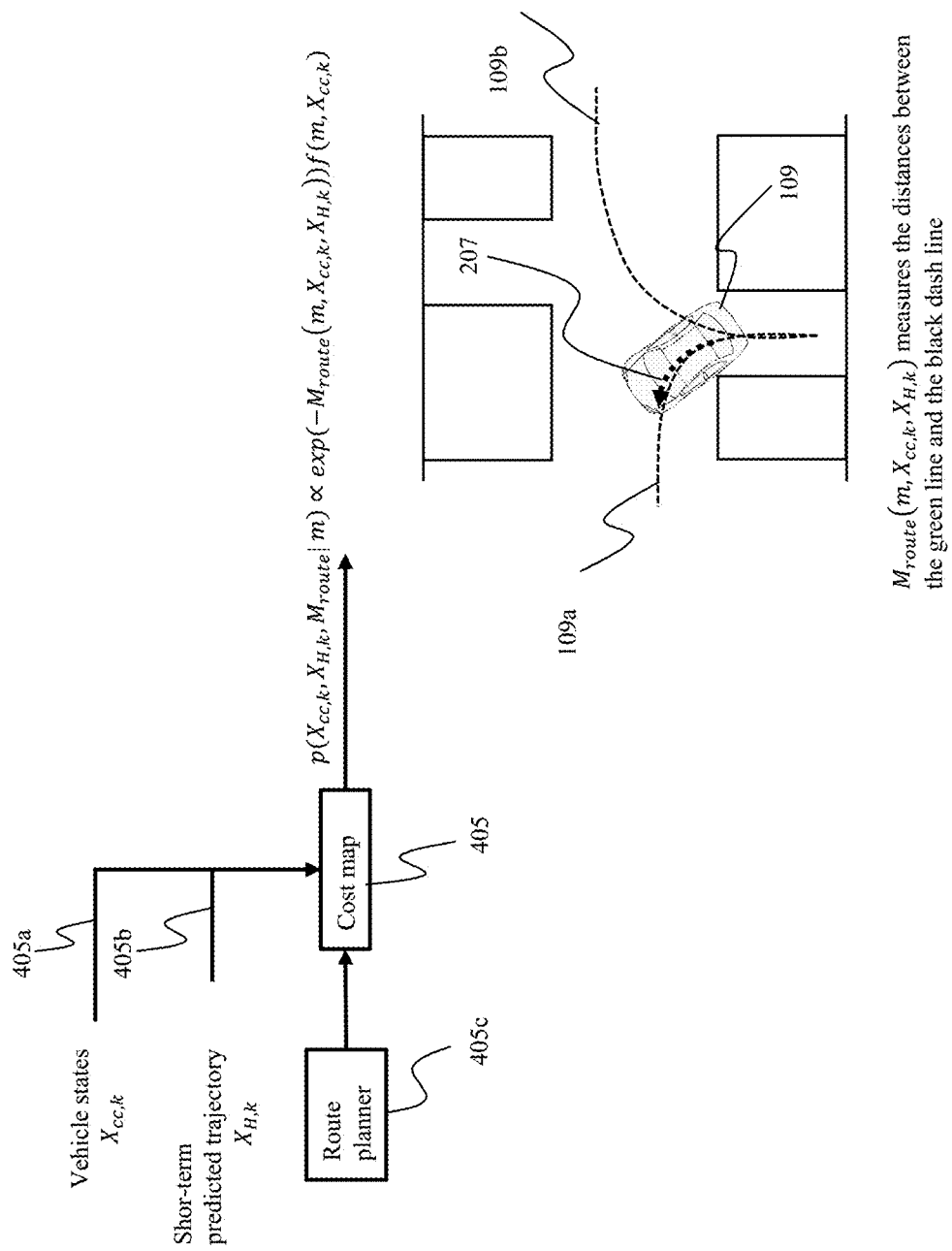
FIG. 4B shows a schematic for formulation of a cost map, according to an embodiment of the present disclosure.

FIG. 4B shows a schematic for formulation of the cost map 405, according to an embodiment of the present disclosure. According to an embodiment, the cost map 405 may be determined based on a vehicle state $X_{cc,k}$ 405a, a short-term predicted trajectory $X_{H,k}$ 405b, and a route planner 405c. The cost map 405 represents a conditional probability of the obstacle vehicle 109 following the predicted path 207 given that the obstacle vehicle 109 is in the mode m. In some embodiments, Boltzmann policy is adopted to represent this conditional probability as $$P(X_{cc,k}, X_{H,k}|m_k) \propto \exp(-M_{route}(m_k, X_{cc,k}, X_{H,k}))f(m_k, X_{cc,k}).$$

Function $M_{route}(m_k, X_{cc,k}, X_{H,k})$ measures a distance between the predicted path 207 and the path 109b related to $m_k$:

$$M_{route}(m_k, X_{cc,k}, X_{H,k}) = \min_i \|X_{m_k,i} - X_{cc,k}\|_{W_1}^2 + \sum_h \min_i \|X_{m_k,i} - X_{h,k}\|_{W_2}^2, \quad (13)$$

where is $X_{m_k,i}$ waypoint of the path in mode $m_k=m$, $m \in \{1, \ldots, 2n\}$, $\|v\|_W^2 = v^T W v$, and $W_1$ and $W_2$ are weighting matrices. Function $f(m_k, X_{cc,k})$ is proportional to a magnitude of the obstacle vehicle 109's steering angle $\delta_{cc,k}$ and a deviation of the obstacle vehicle 109's heading angle $\theta_{cc,k}$ from a final heading angle of the path $\theta_{end,m_k}$, i.e., $$f(m_k, X_{cc,k}) \propto \exp(\|\theta_{end,m_k} - \theta_{cc,k}\|^2 + \lambda_1 \|\delta_{cc,k}\|^2).$$

Figure 5:
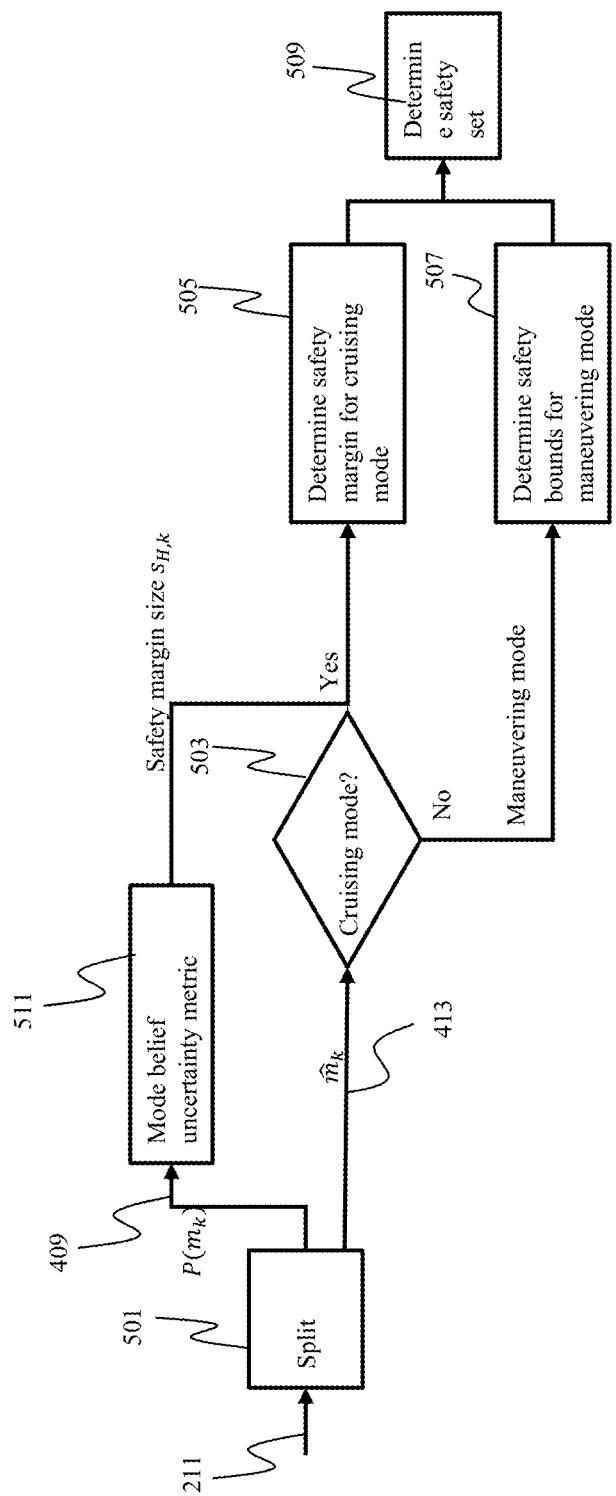
FIG. 5 shows a block diagram for determining a safety constraint and a safety set, according to an embodiment of the present disclosure.

FIG. 5 shows a block diagram for determining the safety constraint (such as safety margin 141 and the safety bounds 143a and 143b) and the safety set, according to an embodiment of the present disclosure. At block 501, the mode probability 211 is split into $P(m_k)$ 409 and the mode $\hat{m}_k$ 413. At block 503, the processor 125 determines if the obstacle vehicle 109 is in the cruising mode, based on $\hat{m}_k$ 413. If the obstacle vehicle 109 is in the cruising mode, then, at block 505, the processor 125 determines safety margins $s_{H,k}=[s_{k+1}^T, \ldots, s_{k+H}^T]^T$ (for example, the safety margin 141 shown in FIG. 1E). According to an embodiment, the safety margin of $h_{th}$ future time step is an ellipsoid and a length of principal semi-axes $s_{k+h}$ (h=1, ..., H) are proportional to differential entropy of a mode belief $b_{uncertainty}$ and a covariance from the motion estimation $P_{m,k+h}$, i.e., $$s_{k+h} \propto (b_{uncertainty} P_{m,k+h}), \text{ where } b_{uncertainty} \propto -\Sigma(b(m_k) \log(b(m_k))).$$

If the obstacle vehicle 109 is not in the cruising mode, then the processor 125 contemplates that the obstacle vehicle 109 is in the maneuvering mode and, at block 507, the processor 125 determines safety bounds (for example, the safety bounds 143a and 143b shown in FIG. 1F). Further, at block 509, the processor 125 determines a safety set based on the safety margin and/or the safety bounds. buncertainty$\propto -\Sigma(b(m_k)\log(b(m_k)))$. Additionally or alternatively, some embodiment use differential entropy of the mode belief as the Mode belief uncertainty metric.

Some embodiments are based on the realization that the motion of the autonomous ego-vehicle 115 in the parking area 100 may be constantly adapted in response to changes of the parking area environment. Hence, even after the trajectory 121 for the autonomous ego-vehicle 115 is determined, a need to adjust the trajectory 121 may arise at any time. To that end, to control the parking of the autonomous ego-vehicle 115, some embodiments use a strategic motion planner that varies control strategy based on different situations in the parking area 100.

For example, in some embodiments, the strategic motion planner uses three different strategies based on different situations. The strategic motion planner includes a model predictive control-based safety controller for trajectory tracking, a search-based retreat planner for finding an evasion path, and an optimization-based repair planner for planning a new trajectory/repair path when a reference trajectory is invalidated. The strategic motion planner strikes a balance between safety, plan feasibility, and smooth maneuvering by leveraging advantages of optimization-based and search-based approaches.

Further, some embodiments are based on the realization that the strategic motion planner can be integrated with the environment predictor to form an integrated motion prediction and planning framework. Such a framework is explained below in FIG. 6.

Figure 6:
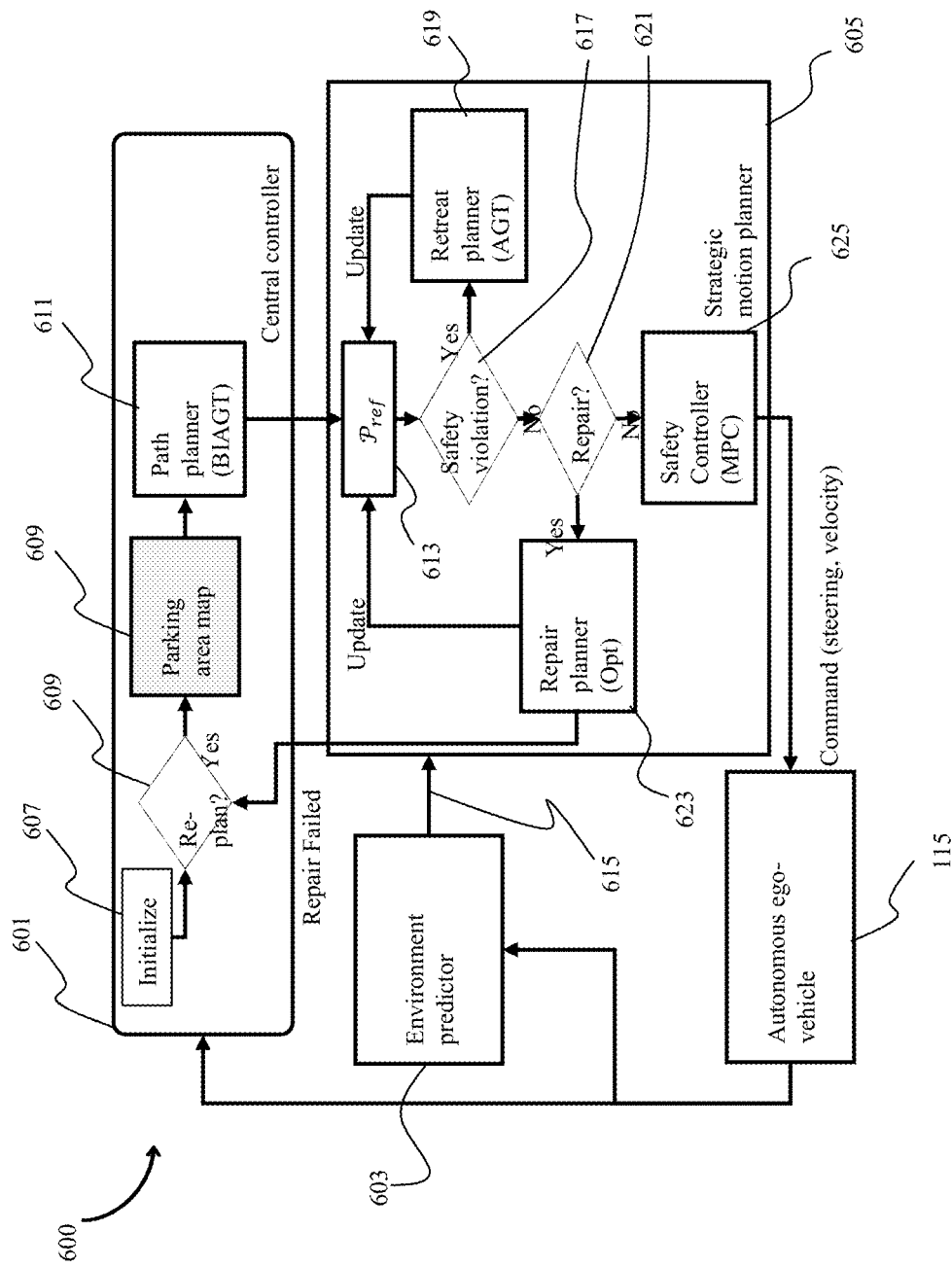
FIG. 6 shows a block diagram of a motion prediction and planning framework, according to an embodiment of the present disclosure.

FIG. 6 shows a block diagram of a motion prediction and planning framework 600, according to an embodiment of the present disclosure. The motion prediction and planning framework 600 includes a central controller 601, an environment predictor 603 and a strategic motion planner 605. The environment predictor 603 is same as the environment predictor 603 described in FIG. 2. In an embodiment, the central controller 601, the environment predictor 603 and the strategic motion planner 605 are stored in the memory 127.

During run-time, the central controller 601 first initializes 607 a path planner 611. The path planner 611 generates a reference trajectory $\mathcal{P}_{ref}$ 613, based on a parking area map 609, without considering the moving obstacle vehicle 109. In an embodiment, a Bi-directional A-search Guide Tree (BIAGT) algorithm used as the path planner 611, as it is guaranteed to plan a trajectory that brings the autonomous ego vehicle 115 to a target state.

The environment predictor 603 monitors the parking area environment and produces prediction 615 of movements of the obstacle vehicle 109. Based on the prediction 615, the strategic motion planner 605 checks 617 if a current state of the autonomous ego-vehicle 115 is violating the safety constraint. If there is safety violation (i.e., the violation of the safety constraint), then a retreat planner 619 is triggered. The retreat planner 619 determines a retreat path to avoid collision with the obstacle vehicle 109 and updates the reference trajectory $\mathcal{P}_{ref}$ 613.

In case, the current state of the autonomous ego-vehicle 115 is not violating the safety constraint, the strategic motion planner 605 checks 621 if the reference trajectory $\mathcal{P}_{ref}$ 613 needs to be repaired. For example, the strategic motion planner 605 checks if it is possible to track the path of the reference trajectory $\mathcal{P}_{ref}$ 613 without stopping the autonomous ego-vehicle 115. If it is not possible to track the path of the reference trajectory $\mathcal{P}_{ref}$ 613 without stopping the autonomous ego-vehicle 115, then a repair planner 623 is activated. The repair planner 623 updates the reference trajectory $\mathcal{P}_{ref}$ 613.

Further, the strategic motion planner 605 determines if it is possible to track the updated reference trajectory without stopping the autonomous ego-vehicle 115. If it is determined that it is possible to track the updated reference trajectory without stopping the autonomous ego-vehicle 115, then a model predictive controller (MPC)-based safety controller 625 is executed to track the updated reference trajectory. In an embodiment, the MPC-based safety controller 625 submits control commands, e.g., steering angle and velocity, to the autonomous ego-vehicle 115 to track the updated reference trajectory.

If the repair planner 623 cannot succeed, for example, if it is determined that it is not possible to track the updated reference trajectory without stopping the autonomous ego-vehicle 115, then the repair planner 623 requests the central controller 601 to re-plan 627 by updating the parking area map 609 and regenerating a reference trajectory.

In an embodiment, the MPC-based safety controller 625 computes tracking motions to follow reference trajectory $\mathcal{P}_{ref}$ in an MPC framework. Let $X_{ref,k}$ be a segment of the reference trajectory $\mathcal{P}_{ref}$ to track at time step k. $X_{ref,k}$ is selected and trimmed so that it neither violates the safety margin (in all modes) nor the safety bounds (in maneuvering mode). The trajectory tracking problem is formulated as follows: Given a planning horizon H, a model the autonomous ego-vehicle 115, and the segment $X_{ref,k}$, solve the following optimization problem for a sequence of control actions $$u_k^* = \underset{u_k}{\operatorname{argmin}} \; \|F(X_k) + G(X_k, X_k, u_k) - X_{ref,k}\|_{W_3}^2, \quad (14)$$

$$\text{s.t.} \quad X_k = F(X_k) + G(X_k, X_k, u_k),$$

$$(X_k, u_k) \in \Gamma_k,$$

Where $X_k = [X_{k+1}^T, X_{k+2}^T, \ldots, X_{k+H}^T]^T$, $u_k = [u_k^T, u_{k+2}^T, \ldots, u_{k+H-1}^T]^T$, and $\Gamma_k$ defines the safety set, $\Gamma_k = \{(X_k, u_k): X_{k+h} \in \mathcal{C}_{free,k}, u_{k+h-1} \in [-u_{max}, u_{max}], \forall h=1, \ldots, H\}$. $\mathcal{C}_{free,k}$ are configurations that maintains the autonomous ego-vehicle 115 to be clear of the safety margins and safety bounds. The optimization problem (14) can be readily formulated as a non-convex optimization problem using various software tools and solved using nonlinear programming solvers, e.g., IPOPT.

Figure 7A:
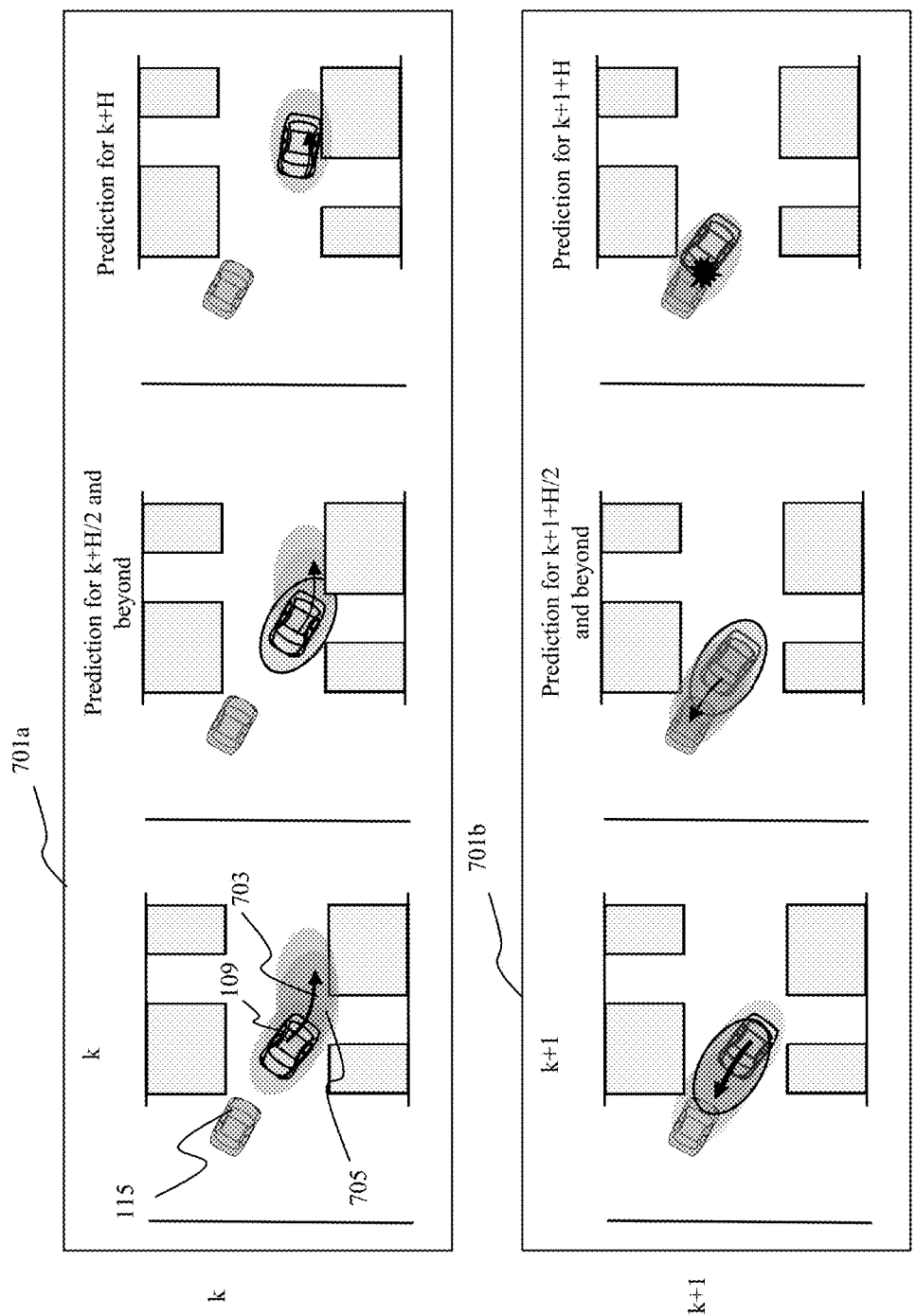
FIG. 7A shows an example scenario where the safety constraint is violated and a retreat planner is triggered, according to an embodiment of the present disclosure.

FIG. 7A shows an example scenario where the safety constraint is violated and the retreat planner 619 is triggered, according to an embodiment of the present disclosure.

Upper row 701*a* shows a prediction at time step k, where a short-term motion predicted trajectory 703 and a safety margin 705 are shown. The processor 125 checks if the safety margin 705 at t, t≤k+H/2 is in collision with the autonomous ego-vehicle's 115 current location. In other words, the processor 125 checks if the safety constraint, i.e., the safety margin 705, is violated. The safety constraint violation normally does not happen unless the obstacle vehicle 109 changes its movement drastically. As shown in bottom row 701*b*, the obstacle vehicle 109 changes its movement in time step k+1, and the autonomous ego-vehicle 115 will suddenly be in collision with the safety margin 705 in H/2 time steps and eventually in collision with the obstacle vehicle 109 if the autonomous ego-vehicle 115 does not retreat. In such a scenario, the retreat planner 619 determines a safe spot and a path between the current location and the safe spot for the autonomous ego-vehicle 115 to retreat.

Figure 7B:
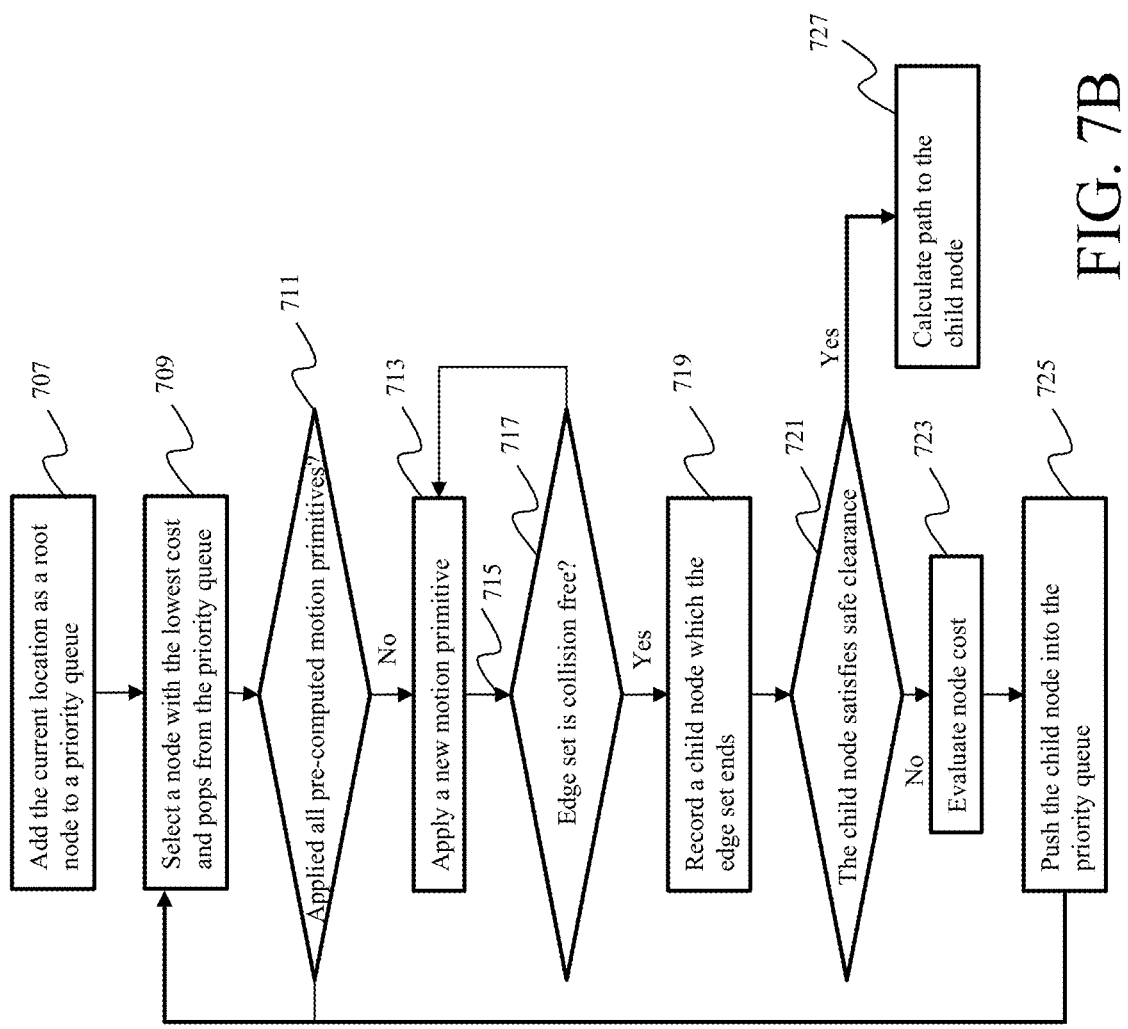
FIG. 7B shows a block diagram of a method of the retreat planner for determining a path between a current location and a safe spot for retreating, according to an embodiment of the present disclosure.

FIG. 7B shows a block diagram of a method of the retreat planner 619 for determining the path between the current location and the safe spot for retreating (i.e., the retreat path), according to an embodiment of the present disclosure. The retreat planner 619 constructs a tree $\mathcal{T}=(\mathcal{V}, \varepsilon)$ composed of a node set $\mathcal{V} \in \mathcal{C}_{free}$ and an edge set $\varepsilon$, where a node in the node set $\mathcal{V}$ represents a collision free state can be reached from the current location, and $E(X_i, X_j) \in \varepsilon$ represents a feasible path between $X_i$ and $X_j$. $\mathcal{C}_{free}$, representing all possible states where the autonomous ego-vehicle 115 does not overlap any obstacles, is implicitly obtained by checking collisions with obstacles in the parking area map. Let $\mathcal{M}$ denote a finite set of motion primitives pre-computed through available control actions, and $V_{max}$ denotes a maximum number of nodes allowed.

At block 707, the processor 125 adds the current location as a root node to a priority queue. At block 709, the processor 125 selects a node with the lowest cost and pops from the priority queue and expands by applying the pre-computed motion primitives. Further, at block 711, the processor 125 checks if all the precomputed motion primitives are applied. If all the precomputed motion primitives are not applied, then, at block 713, the processor 125 applies a new motion primitive to produce an edge set 715. At block 717, the processor 125 determines if the edge set 715 is collision free. If the edge set is not collision free, then again a new motion primitive is applied to produce a new edge set. If the edge set is collision free, then, at block 719, the processor 125 records a child node which the edge set ends. Further, at block 721, the processor determines if the child node satisfies safe clearance, for example, if it is certain distance-away. If the child node does not satisfy the safe clearance, then, at block 723, the processor 125 evaluates node cost. Further, at block 725, the processor 125 pushes the child node into the priority queue. If the child node satisfies the safe clearance, then at block 727, the processor calculates a path from the current location to the child node. The path to the child node corresponds to the retreat path.

The evaluation of node cost performed at block 723 is explained in detail below in FIG. 7C.

Figure 7C:
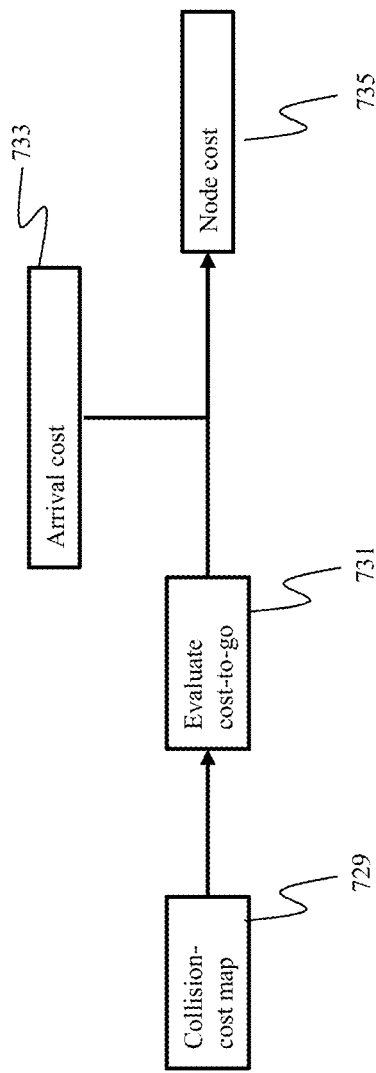
FIG. 7C shows a schematic illustrating an evaluation of node cost, according to an embodiment of the present disclosure.

FIG. 7C shows a schematic illustrating the evaluation of the node cost, according to an embodiment of the present disclosure. A node cost function $\mathcal{F}(\cdot)$ 735 sums up a heuristic value h(•) and an arrival cost g(•) 733. The heuristic value is calculated based on a collision-cost map 729 measuring a risk of collision with the obstacle vehicle 109 if the autonomous ego-vehicle 115 stays at the node. The heuristic value can be alternatively interpreted as potential cost to a safe spot. Typically, the heuristic value is less, the closer the node is to the safe spot. In some embodiments, the arrival cost 733 of a node represents a distance that the autonomous ego-vehicle 115 has to travel from the root node (representing the current state) to the node.

In an embodiment, the collision-cost map 729 is a weighted sum of Gaussian distributions centered at waypoints of both the predicted trajectory $X_{H,k}$, i.e., $X_{h,k}$, and routes on the cost map, i.e., $X_{m_k,i}$, and $$h(X) = \sum_{m_k,i} b(m_k) e^{-\|X - X_{m_k,i}\|^2_{W_4}} + \sum_h c \, e^{-\|X - X_{h,k}\|^2_{W_5}}, \quad (15)$$

where c is a weighting constant, and $W_4$, $W_5$ are weighting matrices.

Figure 7D:
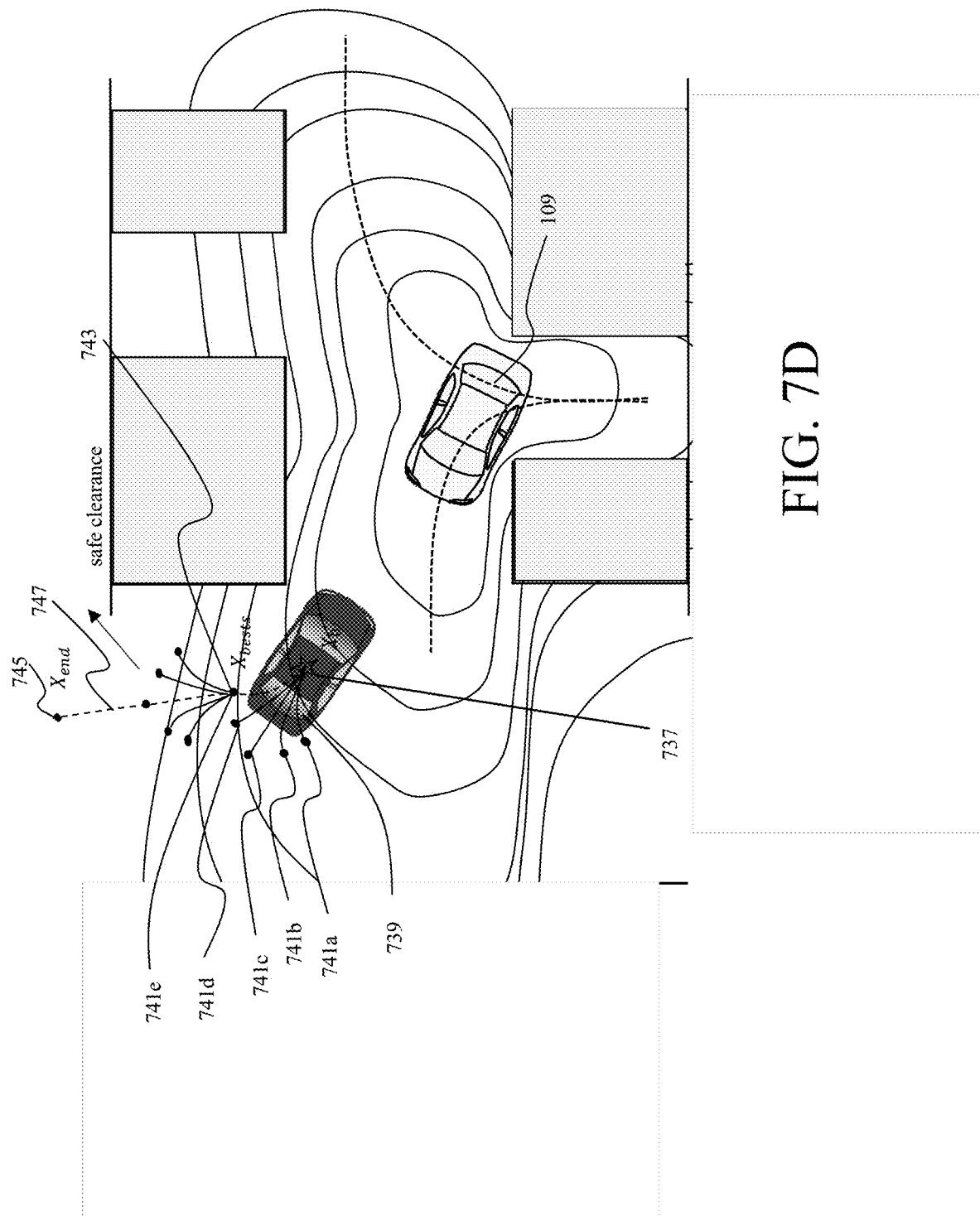
FIG. 7D shows a schematic illustrating a process of the retreat planner, according to an embodiment of the present disclosure.

FIG. 7D shows a schematic illustrating a process of the retreat planner 619, according to an embodiment of the present disclosure. The retreat planner 619 begins with a current location 737, which is likely leading to collision with the obstacle vehicle 109. In the beginning, since the priority queue only contains the root node, the retreat planner 619 selects the root node to expand. Applying a motion primitive 739 ends up with collision-free new node 741*a*. Repeating the application of motion primitives at the root node results in adding another four new nodes to the tree: 741*b*, 741*c*, 741*d*, and 741*e*. All five new nodes 741*a*, 741*b*, 741*c*, 741*d*, and 741*e* are pushed into the priority queue. In next iteration, $X_{best}$ 743 is identified as the best node, due to its lowest node cost, and selected for expansion. Repeating the process eventually yields a new node 745, which satisfies the safe clearance. The tree construction process stops, and the retreat planner 619 returns a retreat goal being node 745, and a path 747 from the root node to the node 745.

Figure 8A:
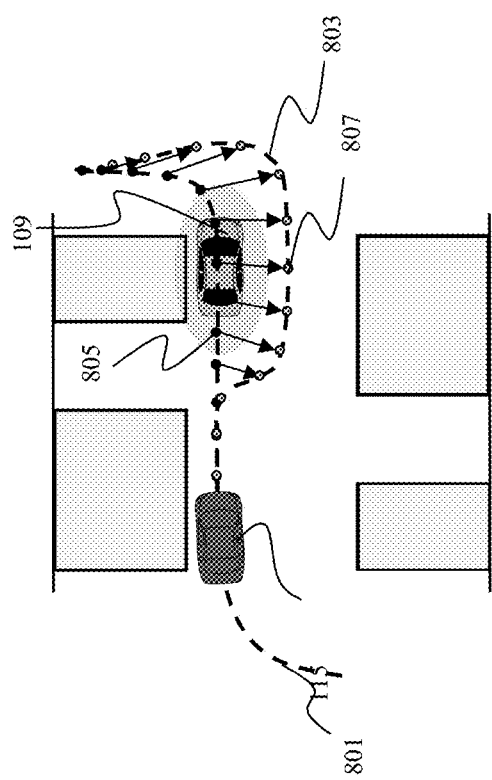
FIG. 8A illustrates an example scenario, where the obstacle vehicle stops on a reference trajectory, according to an embodiment of the present disclosure.

FIG. 8A illustrates an example scenario, where the obstacle vehicle 109 stops on a reference trajectory 801, according to an embodiment of the present disclosure. In such a scenario, the MPC-based safety controller 625 commands the autonomous ego-vehicle 115 to stop on the reference trajectory 801 when an area in front is infeasible. Unless receiving a new reference trajectory, the MPC-based safety controller 625 stops the autonomous ego-vehicle 115 and waits for the obstacle vehicle 109 to clear. However, it is not desirable to wait if the obstacle vehicle 109 stops for a long time. Some embodiments are based on the realization that the obstacle vehicle 109 can be treated as a static obstacle and the reference trajectory 801 can be updated/repaired by the repair planner 623 to form a repaired path 803 such that the autonomous ego-vehicle 115 can go around the obstacle vehicle 109 and merge back to the reference trajectory 801.

According to an embodiment, the repaired path 803 lies in the same homotope class as the reference trajectory 801, which makes an optimization-based repair planner a viable solution. The optimization-based repair planner takes original waypoints 805 as initialization and move them to optimal collision-free locations 807 to form a repaired path 803.

To obtain the repaired path 803 quickly, some embodiments conduct repair planning over the 2D space. A simple kinematic model is used to model the vehicle on a 2D-plane. Denote states at time step k as $z_k=[x_k, y_k]^T$, an input velocity as $u_k=[v_{x,k}, v_{y,k}]^T$, and a robot configuration as $\theta=[x, y]^T$. The kinematic model, is $$\begin{bmatrix} x_{k+1} \\ y_{k+1} \end{bmatrix} = \begin{bmatrix} 1 & 0 \\ 0 & 1 \end{bmatrix} \begin{bmatrix} x_k \\ y_k \end{bmatrix} + \begin{bmatrix} T_s & 0 \\ 0 & T_s \end{bmatrix} \begin{bmatrix} v_{x,k} \\ v_{y,k} \end{bmatrix}. \quad (16)$$

In the optimization problem, a decision variable for each time step is $u_k$, and an input vector that is optimized is denoted as $u:=[u_0^T, u_1^T, \ldots, u_H^T]^T$, where H is a planning horizon. Similarly, a resulting state vector is $z:=[z_1^T, z_2^T, \ldots, z_{H+1}^T]^T$.

Given an initial state, $z_0$, $z=f_{ki}(z_0, u)$ is obtained by concatenating kinematic function throughout the planning horizon. For simplicity, denote the kinematic function as $f_{ki,z_0}(u):=f_{ki}(z_0, u)$. In order to obtain an optimal solution $u^*$ given a constrained feasible set $\Gamma$ and an input constraint $u_{max}$, the following optimization problem needs to be solved:

$$u^* = \underset{u}{\operatorname{argmin}} \ f_{z_0}(u), \quad (17)$$
$$\text{s.t.} \ f_{ki,z_0}(u) \in \Gamma,$$
$$-u_{max} \leq u \leq u_{max}.$$

In some embodiments, cost function is quadratic that has the form: $f_{z_0}(u) = \|f_{ki,z_0}(u) - X_f\|_2^2 + \lambda_2 \|u\|_2^2$, which is convex and regular. The first term penalizes a distance from the goal, $X_f$ and the second term penalizes the input.

Some embodiments are based on an understanding that the repaired path 803, despite being collision-free, cannot always be followed accurately because the repaired path 803 may not satisfy the autonomous ego-vehicle's 115 kinematics or dynamics, causing the autonomous ego-vehicle 115 to collide into obstacles. Therefore, there is a need to verify feasibility of the repaired path 803 before accepting the repaired path 803.

Figure 8B:
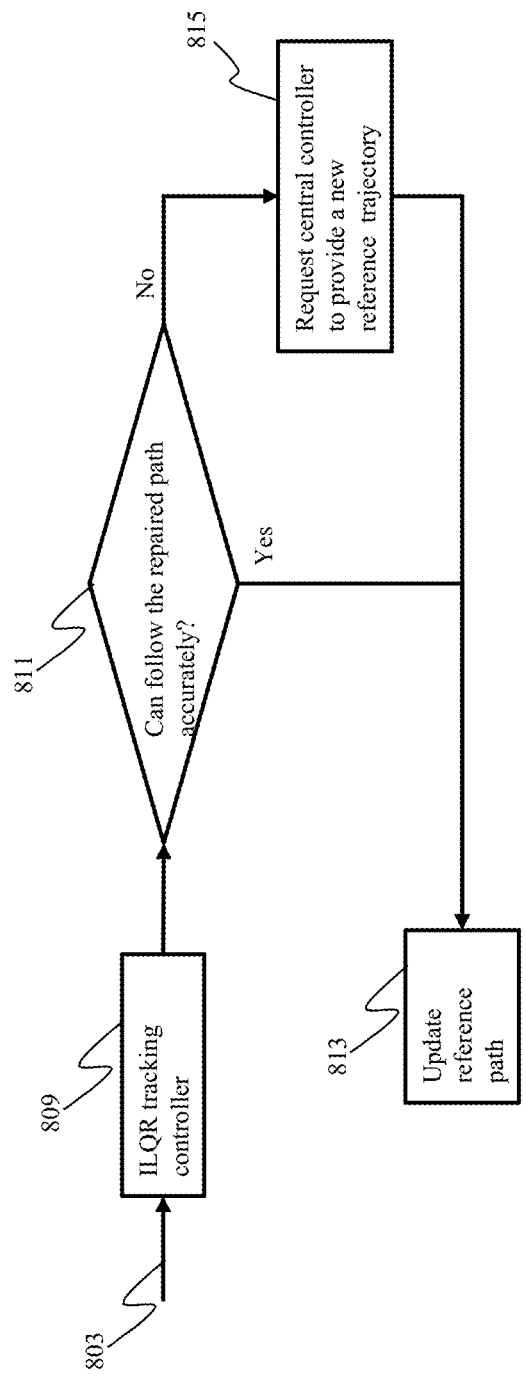
FIG. 8B shows a block diagram for verifying feasibility of a repaired path, according to an embodiment of the present disclosure.

FIG. 8B shows a block diagram for verifying the feasibility of the repaired path 803, according to an embodiment of the present disclosure. At block 809, an iterative linear quadratic regulator (ILQR) tracking controller is used. The ILQR is an optimization-based controller configured to generate a motion plan that tracks the repaired path according to the car kinematics if the repaired path is close to a kinematically feasible trajectory. If the ILQR failed, it means that the repaired path cannot be followed, thus, the repair planner failed. The ILQR, is an extension of a LQR control, and determines a sequence of control in a given time horizon by solving an optimization problem.

At block 811, the processor 125 determines if the repaired path 803 can be followed accurately. If the repaired path 803 can be followed accurately, then, at block 813, the processor 125 updates the reference trajectory 801 based on the repaired path 803. If it is determined that the repaired path 803 cannot be followed accurately, then, at block 815, the processor 125 requests the central controller 601 to provide a new reference trajectory.

Figure 9:
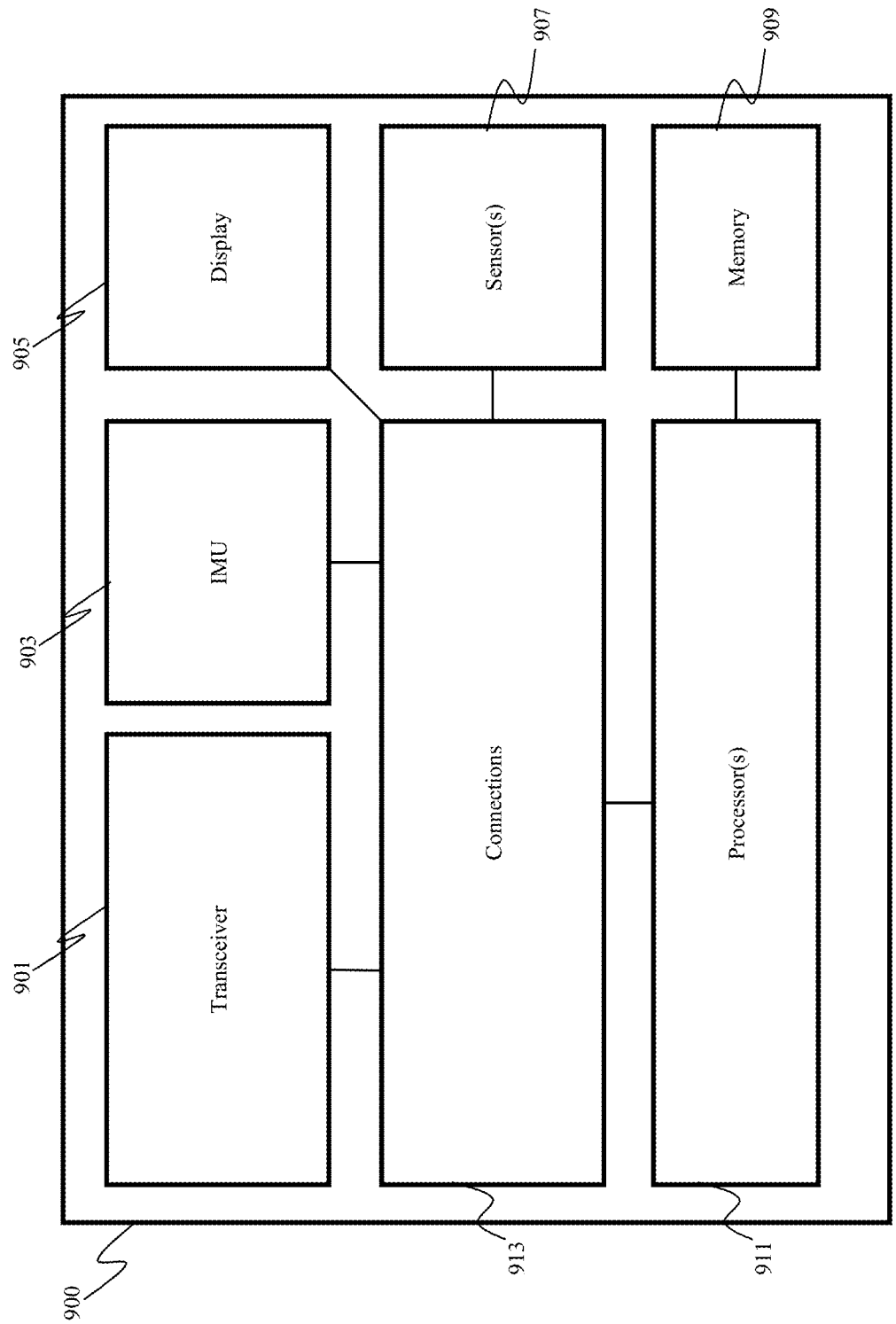
FIG. 9 is a schematic diagram illustrating a system that can be used for implementing systems and methods of the present disclosure.

FIG. 9 is a schematic diagram illustrating a system that can be used for implementing systems and methods of the present disclosure. The system 900 includes one or combination of a transceiver 901, an inertial measurement unit (IMU) 903, a display 905, a sensor(s) 907, a memory 909, and a processor 911, operatively coupled to each other through connections 913. The connections 913 can comprise buses, lines, fibers, links, or combination thereof.

The transceiver 901 can, for example, include a transmitter enabled to transmit one or more signals over one or more types of wireless communication networks and a receiver to receive one or more signals transmitted over the one or more types of wireless communication networks. The transceiver 901 can permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANS) such Bluetooth, Near Field Communication (NFC), networks based on the IEEE 802.15x family of standards, and/or Wireless Wide Area Networks (WWANs) such as LTE, WiMAX, etc. The system 900 can also include one or more ports for communicating over wired networks.

In some embodiments, the system 900 can comprise image sensors such as CCD or CMOS sensors, lasers and/or camera, which are hereinafter referred to as "sensor 907". For example, the sensor 907 can convert an optical image into an electronic or digital image and can send acquired images to processor 911. Additionally, or alternatively, the sensor 907 can sense the light reflected from a target object in a scene and submit the intensities of the captured light to the processor 911.

For example, the sensor 907 can include color or grayscale cameras, which provide "color information." The term "color information" as used herein refers to color and/or grayscale information. In general, as used herein, a color image or color information can be viewed as comprising 1 to N channels, where N is some integer dependent on the color space being used to store the image. For example, an RGB image comprises three channels, with one channel each for Red, Blue, and Green information.

For example, the sensor 907 can include a depth sensor for providing "depth information." The depth information can be acquired in a variety of ways using depth sensors. The term "depth sensor" is used to refer to functional units that may be used to obtain depth information independently and/or in conjunction with some other cameras. For example, in some embodiments, the depth sensor and the optical camera can be part of the sensor 907. For example, in some embodiments, the sensor 907 includes RGBD cameras, which may capture per-pixel depth (D) information when the depth sensor is enabled, in addition to color (RGB) images.

As another example, in some embodiments, the sensor 907 can include a 3D Time Of Flight (3DTOF) camera. In embodiments with 3DTOF camera, the depth sensor can take the form of a strobe light coupled to the 3DTOF camera, which can illuminate objects in a scene and reflected light can be captured by a CCD/CMOS sensor in the sensor 410. Depth information can be obtained by measuring the time that the light pulses take to travel to the objects and back to the sensor.

As a further example, the depth sensor can take the form of a light source coupled to the sensor 907. In one embodiment, the light source projects a structured or textured light pattern, which can include one or more narrow bands of light, onto objects in a scene. Depth information is obtained by exploiting geometrical distortions of the projected pattern caused by the surface shape of the object. One embodiment determines depth information from stereo sensors such as a combination of an infra-red structured light projector and an infra-red camera registered to a RGB camera.

In some embodiments, the sensor 907 includes stereoscopic cameras. For example, a depth sensor may form part of a passive stereo vision sensor, which may use two or more cameras to obtain depth information for a scene. The pixel coordinates of points common to both cameras in a captured scene may be used along with camera pose information and/or triangulation techniques to obtain per-pixel depth information.

In some embodiments, the system 900 can be operatively connected to multiple sensors 907, such as dual front cameras and/or a front and rear-facing cameras, which may also incorporate various sensors. In some embodiments, the sensors 907 can capture both still and video images. In some embodiments, the sensor 907 can include RGBD or stereoscopic video cameras capable of capturing images at, e.g., 30 frames per second (fps). In one embodiment, images captured by the sensor 907 can be in a raw uncompressed format and can be compressed prior to being processed and/or stored in memory 909. In some embodiments, image compression can be performed by the processor 911 using lossless or lossy compression techniques.

In some embodiments, the processor 911 can also receive input from IMU 903. In other embodiments, the IMU 903 can comprise 3-axis accelerometer(s), 3-axis gyroscope(s), and/or magnetometer(s). The IMU 903 can provide velocity, orientation, and/or other position related information to the processor 911. In some embodiments, the IMU 903 can output measured information in synchronization with the capture of each image frame by the sensor 907. In some embodiments, the output of the IMU 903 is used in part by the processor 911 to fuse the sensor measurements and/or to further process the fused measurements.

The system 900 can also include a screen or display 905 rendering images, such as color and/or depth images. In some embodiments, the display 905 can be used to display live images captured by the sensor 907, fused images, augmented reality (AR) images, graphical user interfaces (GUIs), and other program outputs. In some embodiments, the display 905 can include and/or be housed with a touchscreen to permit users to input data via some combination of virtual keyboards, icons, menus, or other GUIs, user gestures and/or input devices such as styli and other writing implements. In some embodiments, the display 905 can be implemented using a liquid crystal display (LCD) display or a light emitting diode (LED) display, such as an organic LED (OLED) display. In other embodiments, the display 480 can be a wearable display. In some embodiments, the result of the fusion can be rendered on the display 905 or submitted to different applications that can be internal or external to the system 900.

Exemplary system 900 can also be modified in various ways in a manner consistent with the disclosure, such as, by adding, combining, or omitting one or more of the functional blocks shown. For example, in some configurations, the system 900 does not include the IMU 903 or the transceiver 901. Further, in certain example implementations, the system 900 include a variety of other sensors (not shown) such as an ambient light sensor, microphones, acoustic sensors, ultrasonic sensors, laser range finders, etc. In some embodiments, portions of the system 400 take the form of one or more chipsets, and/or the like.

The processor 911 can be implemented using a combination of hardware, firmware, and software. The processor 911 can represent one or more circuits configurable to perform at least a portion of a computing procedure or process related to sensor fusion and/or methods for further processing the fused measurements. The processor 911 retrieves instructions and/or data from the memory 909. The processor 911 can be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

The memory 909 can be implemented within the processor 911 and/or external to the processor 911. As used herein the term "memory" refers to any type of long term, short term, volatile, nonvolatile, or other memory and is not to be limited to any particular type of memory or number of memories, or type of physical media upon which memory is stored. In some embodiments, the memory 909 holds program codes that facilitate the automated parking.

For example, the memory 909 can store the measurements of the sensors, such as still images, depth information, video frames, program results, as well as data provided by the IMU 903 and other sensors. The memory 909 can store a memory storing a geometry of the vehicle, a map of the parking space, a kinematic model of the autonomous ego-vehicle, and a dynamic model of the autonomous ego-vehicle. In general, the memory 909 can represent any data storage mechanism. The memory 909 can include, for example, a primary memory and/or a secondary memory. The primary memory can include, for example, a random-access memory, read only memory, etc.

Secondary memory can include, for example, the same or similar type of memory as primary memory and/or one or more data storage devices or systems, such as, for example, flash/USB memory drives, memory card drives, disk drives, optical disc drives, tape drives, solid state drives, hybrid drives etc. In certain implementations, secondary memory can be operatively receptive of, or otherwise configurable to a non-transitory computer-readable medium in a removable media drive (not shown). In some embodiments, the non-transitory computer readable medium forms part of the memory 909 and/or the processor 911.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicate like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the present disclosure has been described with reference to certain preferred embodiments, it is to be understood that various other adaptations and modifications can be made within the spirit and scope of the present disclosure. Therefore, it is the aspect of the appended claims to cover all such variations and modifications as come within the true spirit and scope of the present disclosure.

We claim:

1. An integrated system for parking an autonomous ego-vehicle in a dynamic environment of a parking area, comprising: a processor; and a memory having instructions stored thereon that, when executed by the processor, cause the integrated system to:
    collect measurements of a state of the dynamic environment in the parking area indicative of available parking spots in the parking area, a state of one or multiple stationary vehicles parked in the parking area, and a state of one or multiple obstacle vehicles moving in the parking area;
    execute a path planner configured to produce a trajectory for parking the autonomous ego-vehicle based on the state of the dynamic environment in the parking area;
    execute an environment predictor configured to predict a path and a mode of motion for each obstacle vehicle of the one or multiple obstacle vehicles, wherein the mode of motion includes a first mode of motion or a second mode of motion, and wherein the environment predictor is configured to:
        estimate a position, a velocity, and a steering angle of each obstacle vehicle of the one or multiple obstacle vehicles at different instances of time;
        estimate the path of each obstacle vehicle of the one or multiple obstacle vehicles, based on the position and the velocity of a respective obstacle vehicle of the one or multiple obstacle vehicles at the different instances of time; and
        estimate the mode of the motion of the respective obstacle vehicle of the one or multiple obstacle vehicles, based on the steering angle of the respective obstacle vehicle of the one or multiple obstacle vehicles at the different instances of time;
    determine a safety constraint for each of the obstacle vehicles based on the path and the mode of motion for each of the obstacle vehicles, wherein the safety constraint is determined around the state of an obstacle vehicle of the one or multiple obstacle vehicles along its path if the obstacle vehicle is in the first mode of motion, and wherein the safety constraint is determined in all driving directions around the state of the obstacle vehicle if the obstacle vehicle is in the second mode of motion; and
    park the autonomous ego-vehicle based on the trajectory for parking and the safety constraint for each of the obstacle vehicles.

2. The system of claim 1, wherein the environment predictor is further configured to
    estimate an acceleration, and a steering angular rate of each obstacle vehicle of the one or multiple obstacle vehicles at different instances of time; and
    estimate the path of each obstacle vehicle of the one or multiple obstacle vehicles, based on the acceleration, and the steering angular rate of a respective obstacle vehicle of the one or multiple obstacle vehicles at the different instances of time.

3. The system of claim 2, wherein the environment predictor is further configured to:
    execute a Kalman filter integrating the estimates of the position of the obstacle vehicle to estimate the velocity and acceleration of the obstacle vehicle at the different instances of time; and
    integrate the estimations of the velocity in time to produce estimations of the steering angle and the steering angular rate of the obstacle vehicle at the different instances of time.

4. The system of claim 1, wherein the environment predictor is further configured to determine the mode of the motion of the obstacle vehicle based on an orientation of the obstacle vehicle and the steering angle of the obstacle vehicle at the different instances of time.

5. The system of claim 1, wherein the environment predictor is further configured to:
    execute a Kalman filter integrating the estimates of the position of the obstacle vehicle to estimate the velocity of the obstacle vehicle at the different instances of time; and
    integrate the estimations of the velocity at the different instances of time forward in time to produce estimations of the steering angle at the different instances of time.

6. The system of claim 1, wherein the parking area lies in a geographic area having a plurality of paths, and wherein the environment predictor is further configured to:
    estimate for each path of the plurality of paths, a likelihood of the obstacle vehicle moving on a respective path of the plurality of paths; and
    assign the mode of the motion to the obstacle vehicle corresponding to the path with the highest likelihood amongst the plurality of paths.

7. The system of claim 1, wherein the processor is further configured to execute a strategic motion planner configured to select one of a model predictive controller for tracking a path of the trajectory, a search-based retreat planner for finding an evasion path for the autonomous ego-vehicle, and an optimization-based repair planner for modifying the path of the trajectory.

8. The system of claim 7, wherein the strategic motion planner is further configured to evaluate the trajectory against the safety constraint for each of the obstacle vehicles and execute the model predictive controller if it is possible to track the path of the trajectory without stopping the autonomous ego-vehicle.

9. The system of claim 7, wherein the model predictive controller is further configured to treat the safety constraint as constraints of a trajectory optimization problem, and wherein the trajectory optimization problem optimizes the trajectory to at least one feasible and smooth trajectory that follows the trajectory.

10. The system of claim 7, wherein the strategic motion planner is further configured to evaluate the trajectory against the safety constraint for each of the obstacle vehicles and execute the repair planner to adjust the trajectory if it is not possible to track the path of the trajectory without stopping the autonomous ego-vehicle.

11. The system of claim 10, wherein the repair planner is configured to move original waypoints of the trajectory to optimal collision-free locations to produce a repaired path.

12. The system of claim 7, wherein the strategic motion planner is further configured to evaluate the trajectory against the safety constraint for each of the obstacle vehicles and execute the retreat planner if a current state of the autonomous ego-vehicle following the trajectory violates the safety constraint.

13. The system of claim 12, wherein the retreat planner is configured to:
  obtain one or more new nodes by applying one or more precomputed motion primitives on a root node;
  select a node with the lowest cost from the one or more new nodes and apply one or more precomputed motion primitives at the selected node;
  repeat select and apply until a safe node satisfying safe clearance is found; and
  compute a path to the safe node or the node having the lowest cost as a retreat path if a time out condition is met.

14. A method for parking an autonomous ego-vehicle in a dynamic environment of a parking area, the method comprising:
  collecting measurements of a state of the dynamic environment in the parking area indicative of available parking spots in the parking area, a state of one or multiple stationary vehicles parked in the parking area, and a state of one or multiple obstacle vehicles moving in the parking area;
  executing a path planner configured to produce a trajectory for parking the autonomous ego-vehicle based on the state of the dynamic environment in the parking area;
  executing an environment predictor configured to predict a path and a mode of motion for each obstacle vehicle of the one or multiple obstacle vehicles, wherein the mode of motion includes a first mode of motion or a second mode of motion, and wherein the environment predictor is configured to:
    estimate a position, a velocity, and a steering angle of each obstacle vehicle of the one or multiple obstacle vehicles at different instances of time;
    estimate the path of each obstacle vehicle of the one or multiple obstacle vehicles, based on the position and the velocity of a respective obstacle vehicle of the one or multiple obstacle vehicles at the different instances of time; and
    estimate the mode of the motion of the respective obstacle vehicle of the one or multiple obstacle vehicles, based on the steering angle of the respective obstacle vehicle of the one or multiple obstacle vehicles at the different instances of time;
  determining a safety constraint for each of the obstacle vehicles based on the path and the mode of motion for each of the obstacle vehicles, wherein the safety constraint is determined around the state of an obstacle vehicle along its path if the obstacle vehicle is in the first mode of motion, and wherein the safety constraint is determined in all driving directions around the state of the obstacle vehicle if the obstacle vehicle is in the second mode of motion; and
  parking the autonomous ego-vehicle based on the trajectory for parking and the safety constraint for each of the obstacle vehicles.

15. The method of claim 14, wherein the environment predictor is further configured to determine the mode of the motion of the obstacle vehicle based on an orientation of the obstacle vehicle and the steering angle of the obstacle vehicle at the different instances of time.

16. The method of claim 15, wherein the environment predictor is further configured to:
  execute a Kalman filter integrating the estimates of the position of the obstacle vehicle to estimate the velocity of the obstacle vehicle at the different instances of time; and
  integrate the estimations of the velocity at the different instances of time forward in time to produce estimations of the steering angle at the different instances of time.

17. A non-transitory computer-readable storage medium embodied thereon a program executable by a processor for performing a method for parking an autonomous ego-vehicle in a dynamic environment of a parking area, the method comprising:
  collecting measurements of a state of the dynamic environment in the parking area indicative of available parking spots in the parking area, a state of one or multiple stationary vehicles parked in the parking area, and a state of one or multiple obstacle vehicles moving in the parking area;
  executing a path planner configured to produce a trajectory for parking the autonomous ego-vehicle based on the state of the dynamic environment in the parking area;
  executing an environment predictor configured to predict a path and a mode of motion for each obstacle vehicle of the one or multiple obstacle vehicles, wherein the mode of motion includes a first mode of motion or a second mode of motion, and wherein the environment predictor is configured to:
    estimate a position, a velocity, and a steering angle of each obstacle vehicle of the one or multiple obstacle vehicles at different instances of time;
    estimate the path of each obstacle vehicle of the one or multiple obstacle vehicles, based on the position and the velocity of a respective obstacle vehicle of the one or multiple obstacle vehicles at the different instances of time; and estimate the mode of the motion of the respective obstacle vehicle of the one or multiple obstacle vehicles, based on the steering angle of the respective obstacle vehicle of the one or multiple obstacle vehicles at the different instances of time;

determining a safety constraint for each of the obstacle vehicles based on the path and the mode of motion for each of the obstacle vehicles, wherein the safety constraint is determined around the state of an obstacle vehicle along its path if the obstacle vehicle is in the first mode of motion, and wherein the safety constraint is determined in all driving directions around the state of the obstacle vehicle if the obstacle vehicle is in the second mode of motion; and parking the autonomous ego-vehicle based on the trajectory for parking and the safety constraint for each of the obstacle vehicles.

\* \* \* \* \*